United States Patent
Kato et al.

(10) Patent No.: US 7,676,314 B2
(45) Date of Patent: Mar. 9, 2010

(54) MOTION CONTROL APPARATUS FOR A VEHICLE

(75) Inventors: Toshihisa Kato, Handa (JP); Junya Nagaya, Chiryu (JP); Tokio Yakushijin, Ikeda (JP)

(73) Assignees: Advics Co., Ltd., Kariya, Aichi-Pref. (JP); Daihatsu Motor Co., Ltd., Ikeda-Shi, Osaka (JP)

( * ) Notice: Subject to any disclaimer, the term of this patent is extended or adjusted under 35 U.S.C. 154(b) by 987 days.

(21) Appl. No.: 10/523,590

(22) PCT Filed: Jul. 28, 2003

(86) PCT No.: PCT/JP03/09513
§ 371 (c)(1),
(2), (4) Date: Feb. 4, 2005

(87) PCT Pub. No.: WO2004/012971
PCT Pub. Date: Feb. 12, 2004

(65) Prior Publication Data
US 2006/0041366 A1    Feb. 23, 2006

(30) Foreign Application Priority Data

Aug. 6, 2002 (JP) ............................. 2002-228367
Aug. 6, 2002 (JP) ............................. 2002-228373

(51) Int. Cl.
*G06G 1/00* (2006.01)
(52) U.S. Cl. ............................. 701/72; 701/70; 701/79; 303/146; 180/167; 180/168
(58) Field of Classification Search .................. 701/72, 701/70, 74, 79, 93; 303/146; 180/167, 168, 180/170
See application file for complete search history.

(56) References Cited

U.S. PATENT DOCUMENTS 5,259,476 A * 11/1993 Matsuno et al. ............. 180/197

(Continued)

FOREIGN PATENT DOCUMENTS

JP    63-279976 A    11/1988

(Continued)

OTHER PUBLICATIONS

Japanese Official Action and English Language Translation of Japanese Official Action.

(Continued)

*Primary Examiner*—Gertrude Arthur Jeanglaud
(74) *Attorney, Agent, or Firm*—Buchanan, Ingersoll & Rooney, PC

(57) ABSTRACT

When the absolute value of the steering angle equals or is greater than a prescribed angle, a vehicle motion control apparatus sets a control gear ratio so that when an estimated vehicle-body speed is equal to or greater than a prescribed value, the control gear ratio becomes a value equal to or greater than a certain value and which increases with estimated vehicle-body speed as the absolute value of the steering angle increases. When the estimated vehicle-body speed is less than the prescribed value, the control gear ratio becomes a value not greater than the certain value and which decreases with estimated vehicle-body speed as the absolute value of the steering angle increases. The apparatus then calculates a target yaw rate making use of the control gear ratio, and controls a braking force applied to each wheel so that the actual yaw rate coincides with the target yaw rate.

11 Claims, 13 Drawing Sheets

U.S. PATENT DOCUMENTS

| | | | | |
|---|---|---|---|---|
| 5,636,909 | A * | 6/1997 | Hirao et al. | 303/140 |
| 5,869,943 | A * | 2/1999 | Nakashima et al. | 318/586 |
| 6,081,761 | A | 6/2000 | Harada et al. | |
| 6,092,014 | A * | 7/2000 | Okada | 701/70 |
| 6,125,319 | A * | 9/2000 | Hac et al. | 701/80 |
| 6,163,747 | A * | 12/2000 | Matsuno | 701/80 |
| 6,208,927 | B1 * | 3/2001 | Mine et al. | 701/70 |
| 6,301,534 | B1 * | 10/2001 | McDermott et al. | 701/41 |
| 6,324,446 | B1 * | 11/2001 | Brown et al. | 701/1 |
| 6,497,298 | B2 * | 12/2002 | Irie et al. | 180/197 |
| 6,778,896 | B1 * | 8/2004 | Matsuura et al. | 701/70 |
| 2001/0044691 | A1 * | 11/2001 | Ishizu et al. | 701/93 |

FOREIGN PATENT DOCUMENTS

| | | |
|---|---|---|
| JP | 2000-108866 A | 4/2000 |
| JP | 2000-289595 A | 10/2000 |
| JP | 2001-171500 A | 6/2001 |
| JP | 2002-2517 A | 1/2002 |

OTHER PUBLICATIONS

Japanese Official Action and Partial English Language Translation of Japanese Official Action.

Office Action issued in corresponding Japanese Application No. 2002-228373 dated Jan. 6, 2009 with partial English Translation.

* cited by examiner

US 7,676,314 B2

MOTION CONTROL APPARATUS FOR A VEHICLE

TECHNICAL FIELD

The present invention relates to a motion control apparatus for a vehicle which controls the motion of a vehicle by controlling the braking force applied to the front and rear wheels of the vehicle.

BACKGROUND ART

From the past, there has been a desire for improvements in the turning and tracing ability of vehicles. In view of this, a braking force control apparatus disclosed in, for example, in Japanese Patent Application Laid-Open (kokai) No. 9-2235 applies a braking force to the rear wheels of a vehicle when the rotational speed of the steering wheel which steers the steerable wheels of the vehicle exceeds a prescribed value. With this arrangement, when, for example, a driver attempts to suddenly turn a vehicle by rotating the steering wheel at a rotational speed greater than the prescribed value, the cornering force of the rear wheels of the vehicle decreases. Accordingly, the yaw rate in the direction of turning of the vehicle increases, thereby improving the turning and tracing ability of the vehicle.

However, the greater the extent to which the turning and tracing ability of the vehicle is improved, the greater the tendency of the vehicle body rolling excessively. This tendency arises markedly in particular when the vehicle turns at a relatively high speed or when the driver performs abrupt steering operation. Accordingly, the above-described, disclosed apparatus has a drawback in that the vehicle body rolls excessively, and in some cases becomes unstable during turning.

DISCLOSURE OF THE INVENTION

An object of the present invention is to provide a motion control apparatus for a vehicle which can prevent the vehicle from rolling excessively to thereby secure stability of the vehicle.

A motion control apparatus for a vehicle according to the present invention is characterized by comprising vehicle-body speed obtaining means for obtaining a vehicle-body speed of the vehicle; steering-member operating amount obtaining means for obtaining an operating amount of a steering member of the vehicle which changes a steering angle of steerable wheels of the vehicle; actual lateral acceleration related quantity obtaining means for obtaining, as an actual lateral acceleration related quantity, an actual value of a lateral acceleration related quantity indicating the extent of turning of the vehicle; target lateral acceleration related quantity calculating means for calculating a target lateral acceleration related quantity which is deviated from a reference lateral acceleration related quantity so as to prevent the vehicle body from rolling excessively, the reference lateral acceleration related quantity being determined by a prescribed rule based on at least the vehicle-body speed and the steering-member operating amount; and braking force control means for controlling a braking force applied to each of front and rear wheels of the vehicle so that the actual lateral acceleration related quantity approaches the target lateral acceleration related quantity.

More specifically, the target lateral acceleration related quantity calculating means is preferably configured to calculate, as the target lateral acceleration related quantity, a quantity which is deviated from the reference lateral acceleration related quantity in accordance with the vehicle-body speed.

The "lateral acceleration related quantity" is a quantity indicating the extent of turning of the vehicle. An example of the lateral acceleration related quantity is the lateral acceleration (a component of the acceleration acting on the vehicle in the lateral direction of the vehicle body) or a yaw rate.

With this arrangement, the reference lateral acceleration related quantity is determined in accordance with a previously determined prescribed rule expressed by a theoretical formula derived from a model of the vehicle motion and on the basis of the vehicle-body speed obtained by the vehicle-body speed obtaining means, the steering-member operating amount (such as the amount of operation (rotational angle) of the steering member (steering wheel) from a reference position in which the vehicle travels straight) obtained by the steering-member operating amount obtaining means, and a prescribed actual specification value of the vehicle (such as the gear ratio and a stability factor).

The target lateral acceleration related quantity calculating means calculates, as the target lateral acceleration related quantity, a quantity which is deviated from the reference lateral acceleration related quantity in accordance with the vehicle-body speed obtained by the vehicle-body speed obtaining means. Accordingly, when, for example, the vehicle-body speed is high, the target lateral acceleration related quantity is calculated in accordance with the vehicle-body speed so that the target lateral acceleration related quantity (its absolute value) is less than or equal to the reference lateral acceleration related quantity (its absolute value), and when the vehicle-body speed is low, the target lateral acceleration related quantity is calculated in accordance with the vehicle-body speed so that the target lateral acceleration related quantity (its absolute value) is at least the reference lateral acceleration related quantity (its absolute value).

The braking force control means controls the braking force applied to each of the front wheels and the rear wheels of the vehicle such that the actual lateral acceleration related quantity obtained by the actual lateral acceleration related quantity obtaining means approaches the target lateral acceleration related quantity calculated in the above-described manner. Accordingly, when the vehicle is in the middle of turning or when it is starting to turn, and the vehicle-body speed is high, the braking force applied to each wheel is controlled such that a lateral acceleration related quantity of the vehicle which is smaller than the reference lateral acceleration related quantity is generated. Therefore, as compared with the case where the braking force applied to each wheel is controlled so as to generate the reference lateral acceleration related quantity, generation of excessive rolling of the vehicle body can be prevented, and the stability of the vehicle can be secured. When the vehicle-body speed is low, the braking force of each wheel is controlled such that a lateral acceleration related quantity which is larger than the reference lateral acceleration related quantity of the vehicle is generated, so that, as compared with the case where the braking force applied to each wheel is controlled so as to generate the reference lateral acceleration related quantity, the turning and tracing ability of the vehicle is improved. Notably, when the vehicle-body speed is low, the vehicle body hardly rolls excessively, so that the vehicle does not become unstable even if priority is given to improvement of the turning and tracing ability of the vehicle.

More specifically, when the vehicle-body speed is at least a prescribed value, the target lateral acceleration related quantity calculating means preferably calculates the target lateral acceleration related quantity in accordance with the vehicle-body speed so that the absolute value of the target lateral acceleration related quantity is equal to or less than the absolute value of the reference lateral acceleration related quantity, and when the vehicle-body speed is less than the prescribed value, it preferably calculates the target lateral acceleration related quantity in accordance with the vehicle-body speed so that the absolute value of the target lateral acceleration related quantity is greater than or equal to the absolute value of the reference lateral acceleration related quantity. As a result, in the same manner as described above, with a simple structure, the turning and tracing ability of the vehicle during low-speed travel can be improved, and simultaneously, generation of excessive rolling during high-speed travel can be prevented.

In this case, the target lateral acceleration related quantity calculating means is preferably constructed to change the amount by which the target lateral acceleration related quantity deviates from the reference lateral acceleration related quantity in accordance with the steering-member operating amount. In general, during low-speed travel, the extent to which the turning and tracing ability of a vehicle worsens increases with the steering-member operating amount (the amount of steering member operation (rotational angle) from a reference position of the steering member corresponding to a reference angle of the steerable wheels of the vehicle at which the vehicle travels straight). Furthermore, during high-speed travel, the degree of generation of excessive rolling increases with the steering-member operating amount.

Accordingly as described above, if the structure is such that the amount of deviation of the target lateral acceleration related quantity from the reference lateral acceleration related quantity varies in accordance with not only the vehicle-body speed but also in accordance with the steering-member operating amount, the deviation (its absolute value) can be set such that it increases with the steering-member operating amount, and as a result, the extent to with the turning and tracing ability of the vehicle is improved and the extent to which generation of excessive rolling is prevented can be appropriately set in accordance with the extent to which the turning and tracing ability of the vehicle would otherwise decrease during low-speed travel and the extent to which excessive rolling would otherwise be generated during high-speed travel, and the state of motion of the vehicle (the state of turning motion) can be made to more closely approach an ideal state.

In the above-described motion control apparatus for a vehicle according to the present invention, the above-described prescribed rule preferably determines the reference lateral acceleration related quantity based on an actual specification value of the vehicle which influences the turning properties of the vehicle; and the target lateral acceleration related quantity calculating means preferably calculates, as the target lateral acceleration related quantity, the reference lateral acceleration related quantity determined in accordance with the prescribed rule and on the basis of a control specification value instead of the actual specification value, the control specification value being deviated from the actual specification value in accordance with the vehicle-body speed or the vehicle-body speed and the steering-member operating amount. Examples of the "actual specification value of the vehicle" include the gear ratio and a stability factor, but the actual specification value is not limited to these examples.

In the above-described motion control apparatus for a vehicle, in the stage of design and development of the apparatus before the apparatus is used, it is necessary to previously determine the amount of deviation of the target lateral acceleration related quantity from the reference lateral acceleration related quantity which should be set in accordance with the vehicle-body speed or the vehicle-body speed and the steering-member operating amount. In this case, as described above, if the structure is such that the amount of deviation is determined by calculating, as the target lateral acceleration related quantity, the reference lateral acceleration related quantity determined according to the prescribed rule but using the control specification value, which is deviated from the actual specification value in accordance with the vehicle-body speed or the vehicle-body speed and the steering-member operating amount, instead of the actual specification value, the amount of deviation can be determined merely by previously determining the control specification value in the stage of design and development of the apparatus in accordance with the vehicle-body speed or the vehicle-body speed and the steering-member operating amount.

It is relatively easy to previously predict and estimate the extent of the change in the motion properties (turning properties) of a vehicle when a specific specification value for the vehicle (such as the gear ratio) is changed. Accordingly, with the above-described structure, the time required for tuning and determination of the control specification value by various types of vehicle tests and vehicle simulations can be shortened, and the man-hours required for the design and development stage of the above-described motion control apparatus for a vehicle can be decreased.

In this case, the target lateral acceleration related quantity calculating means is preferably constructed to calculate the target lateral acceleration related quantity in such a manner that the absolute value of the target lateral acceleration related quantity is equal to or less than the absolute value of the reference lateral acceleration related quantity.

By virtue of this configuration, in the case where the vehicle starts abrupt turning in response to, for example, abrupt steering operation by the driver and the actual lateral acceleration related quantity tends to increase, the actual lateral acceleration related quantity is immediately lowered to a value smaller than the reference lateral acceleration related quantity, through generation of a yawing moment in the vehicle in a direction for reducing the magnitude of the actual lateral acceleration related quantity, whereby the vehicle is prevented from becoming unstable during turning, which unstable condition would otherwise arise due to generation of an excessively large roll angle of the vehicle body.

In this case, the target lateral acceleration related quantity calculating means is preferably constructed such that the amount by which the target lateral acceleration related quantity deviates from the reference lateral acceleration related quantity changes in accordance with the absolute value of the reference lateral acceleration related quantity. The roll angle of the vehicle body increases with the actual lateral acceleration acting on the vehicle. Accordingly, the vehicle body becomes likely to roll excessively with an increase in the absolute value of the reference lateral acceleration related quantity determined in accordance with the prescribed rule expressed by, for example, a theoretical formula derived from a model of the vehicle motion.

Accordingly, through employment of the above-described configuration in which the amount by which the target lateral acceleration related quantity deviates (decreases) from the reference lateral acceleration related quantity is changed in accordance with the absolute value of the reference lateral acceleration related quantity, the deviation amount can be increased with, for example, the absolute value of the reference lateral acceleration related quantity. As a result, the extent to which generation of excessive rolling of the vehicle is prevented is properly set in accordance with the degree of likelihood of the vehicle body rolling excessively, whereby the state of motion of the vehicle (the sate of turning motion) can be made to more closely approach an ideal state.

In the motion control apparatus for a vehicle, the target lateral acceleration related quantity calculating means is preferably constructed to calculate the target lateral acceleration related quantity in such a manner that the absolute value of the target lateral acceleration related quantity does not exceed a target lateral acceleration related quantity limiting value, which is set in accordance with the actual specification value of the vehicle which influences the generated roll angle of the vehicle. Here, the "target lateral acceleration related quantity limiting value" may have a predetermined range. Further, an example of the "actual specification value of the vehicle which influences the generated roll angle of the vehicle" includes, but is not limited to, the ratio of the centroid height, which is the vertical distance between the centroid of the vehicle and the road surface, to the wheel tread, which is the lateral distance between the center of the contact surface between the tire tread of a left wheel and the road surface and that of a right wheel.

By virtue of this configuration, the target lateral acceleration related quantity limiting value is set to fall within a range of the lateral acceleration related quantity in which the vehicle body does not roll excessively when the actual specification value of the vehicle is considered. Therefore, the absolute value of the target lateral acceleration related quantity can also be set to a value within that range. Accordingly, generation of excessive rolling of the vehicle body can be prevented more reliably.

Moreover, preferably, the motion control apparatus for a vehicle further comprises road-surface friction coefficient obtaining means for obtaining a road-surface friction coefficient, which is the coefficient of friction between a road surface on which the vehicle travels and tires of the wheels of the vehicle; and target lateral acceleration related quantity limiting means for setting a target lateral acceleration related quantity limiting value in accordance with the road-surface friction coefficient and for limiting the target lateral acceleration related quantity, when the absolute value of the target lateral acceleration related quantity is greater than the target lateral acceleration related quantity limiting value, in such a manner that the absolute value of the target lateral acceleration related quantity coincides with the target lateral acceleration related quantity limiting value. Here, the "target lateral acceleration related quantity limiting value" may have a predetermined range.

In general, the maximum value of the lateral acceleration acting on the vehicle (lateral acceleration related quantity) depends on the coefficient of friction of the road surface on which the vehicle is traveling, and decreases with the road-surface friction coefficient. Accordingly, if the target lateral acceleration related quantity calculating means calculates the target lateral acceleration related quantity without consideration of the road-surface friction coefficient, depending on the travel condition of the vehicle, such as the case where the vehicle turns on a road surface having a low road-surface friction coefficient, the magnitude of the target lateral acceleration related quantity may exceed the range of the lateral acceleration related quantity which the vehicle can generate at that time and which depends on the road-surface friction coefficient.

In such a case, if an attempt is made to apply to the individual wheels of the vehicle a braking force corresponding to the deviation between the target lateral acceleration related quantity and the actual lateral acceleration related quantity, to thereby cause the actual lateral acceleration related quantity to approach the target lateral acceleration related quantity, an excessively large braking force is applied to the wheels when the deviation is excessively large, whereby locking of the wheels or the like occurs, and the turning motion of the vehicle may become unstable.

In contrast, the motion control apparatus is configured in such a manner that when the absolute value of the target lateral acceleration related quantity is greater than the target lateral acceleration related quantity limiting value, which is set in accordance with the road-surface friction coefficient, the target lateral acceleration related quantity is limited In such a manner that the absolute value of the target lateral acceleration related quantity coincides with the target lateral acceleration related quantity limiting value. Therefore, the absolute value of the target lateral acceleration related quantity is limited to fall in the range of the lateral acceleration related quantity which the vehicle can generate at that time and which depends on the road-surface friction coefficient. Therefore, when the vehicle turns on a road surface having a low road-surface friction coefficient, the deviation between the target lateral acceleration related quantity and the actual lateral acceleration related quantity does not become excessively large. As a result, the turning motion of the vehicle can be prevented from becoming unstable, which unstable condition would otherwise occur because of application of an excessively large braking force to the wheels.

BEST MODE FOR CARRYING OUT THE INVENTION

Figure 1:
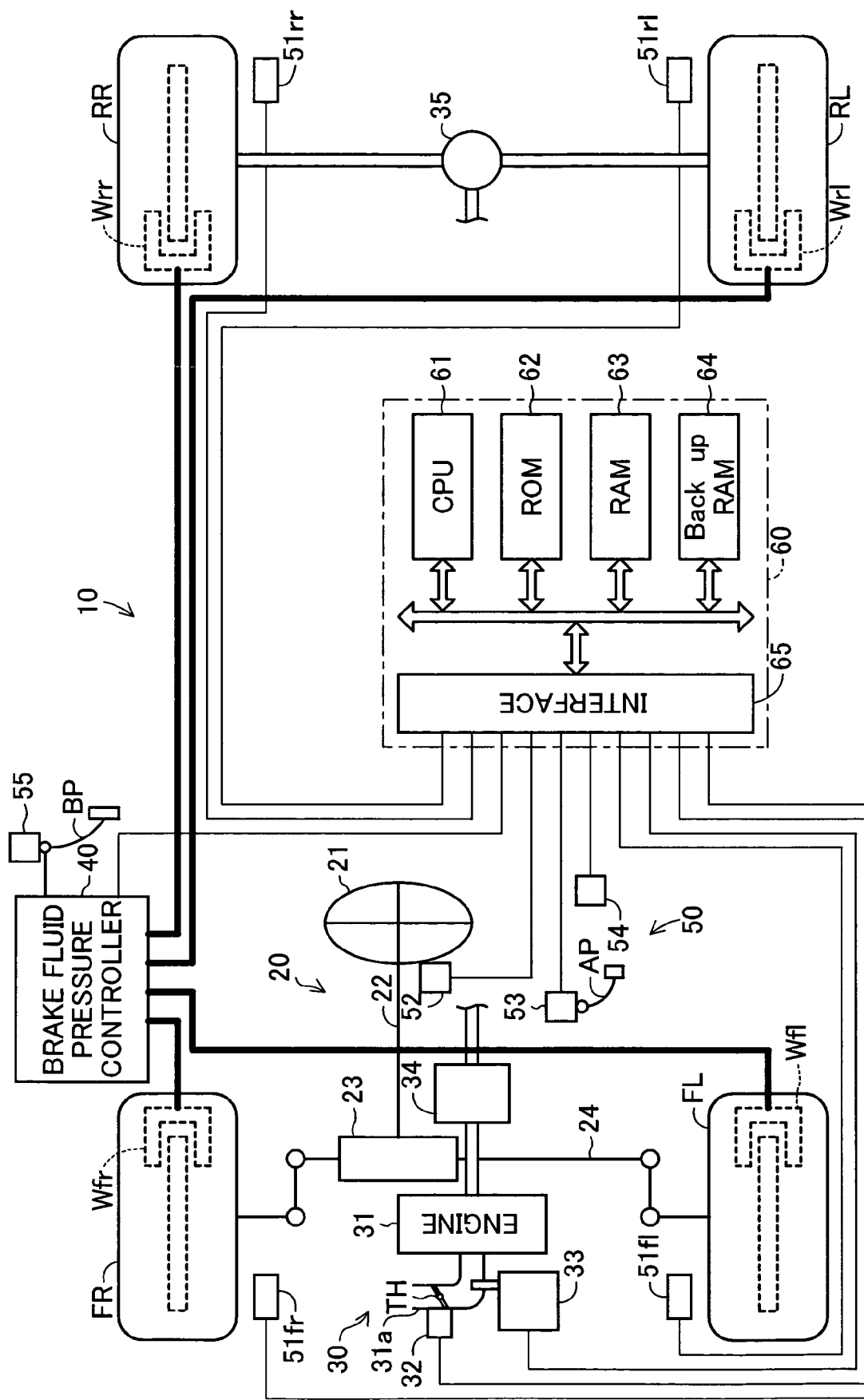
FIG. 1 is a schematic diagram of a vehicle equipped with a motion control apparatus for a vehicle according to a first embodiment of the present invention.

Below, embodiments of a motion control apparatus for a vehicle according to the present invention will be described while referring to the drawings.

First Embodiment

FIG. 1 schematically illustrates a vehicle on which a vehicle motion control apparatus 10 according to the first embodiment of the present invention is mounted. The illustrated vehicle is a four-wheel, rear-wheel drive vehicle having two front wheels (a front left wheel FL and a front right wheel FR) which are steerable, nondriven wheels, and two rear wheels (a rear left wheel RL and a rear right wheel RR) which are driven wheels.

This vehicle motion control apparatus 10 has a front-wheel steering mechanism portion 20 for steering the steerable wheels FL and FR; a drive force transmission mechanism portion 30 which generates a drive force and transmits it to the drive wheels RL and RR; a brake fluid pressure controller 40 for generating a braking force in each wheel by brake fluid pressure; a sensor portion 50 comprising various sensors; and an electronic controller 60.

The front-wheel steering mechanism 20 comprises a steering wheel 21, a steering column 22 which is rotatable together with the steering wheel 21, a steering actuator 23 which is linked to the steering column 22, and a link mechanism 24 which includes a tie rod moved to the left and right of the vehicle body by the steering actuator 23 and which can turn the steerable wheels FL and FR by the movement of the tie rod. When the steering wheel 21 is rotated by the driver from a neutral position (a reference position), the steering angle of the steerable wheels FL and FR is changed from a reference angle in which the vehicle goes straight. The gear ratio of the front wheel steering mechanism 20, which is an actual specification value of the vehicle, has a constant value of 20.

The steering actuator 23 includes a known, so-called hydraulic power steering apparatus. The steering actuator 23 generates an assist force which moves the tie rod in accordance with rotational torque of the steering wheel 21, i.e., the steering column 22. The steering actuator 23 displaces the tie rod by the assist force to the left and right of the vehicle body from its neutral position in proportion to the steering angle θs of the steering wheel 21 from its neutral position. The structure and operation of such a steering actuator 23 are well known, so a detailed description thereof will be omitted.

The drive force transmission mechanism portion 30 comprises an engine 31 which generates a drive force, a throttle valve actuator 32 comprising a DC motor which controls the opening of a throttle valve TH which is disposed in the intake pipe 31a of the engine 31 and which varies the open cross-sectional area of the intake pipe 31a, a fuel injection apparatus 33 which includes unillustrated fuel injectors which spray fuel in the vicinity of unillustrated intake ports of the engine 31, a transmission 34 which is connected to an output shaft of the engine 31, and a differential gear 35 which distributes the drive force which is transmitted from the transmission 34 between the rear wheels RR and RL.

Figure 2:
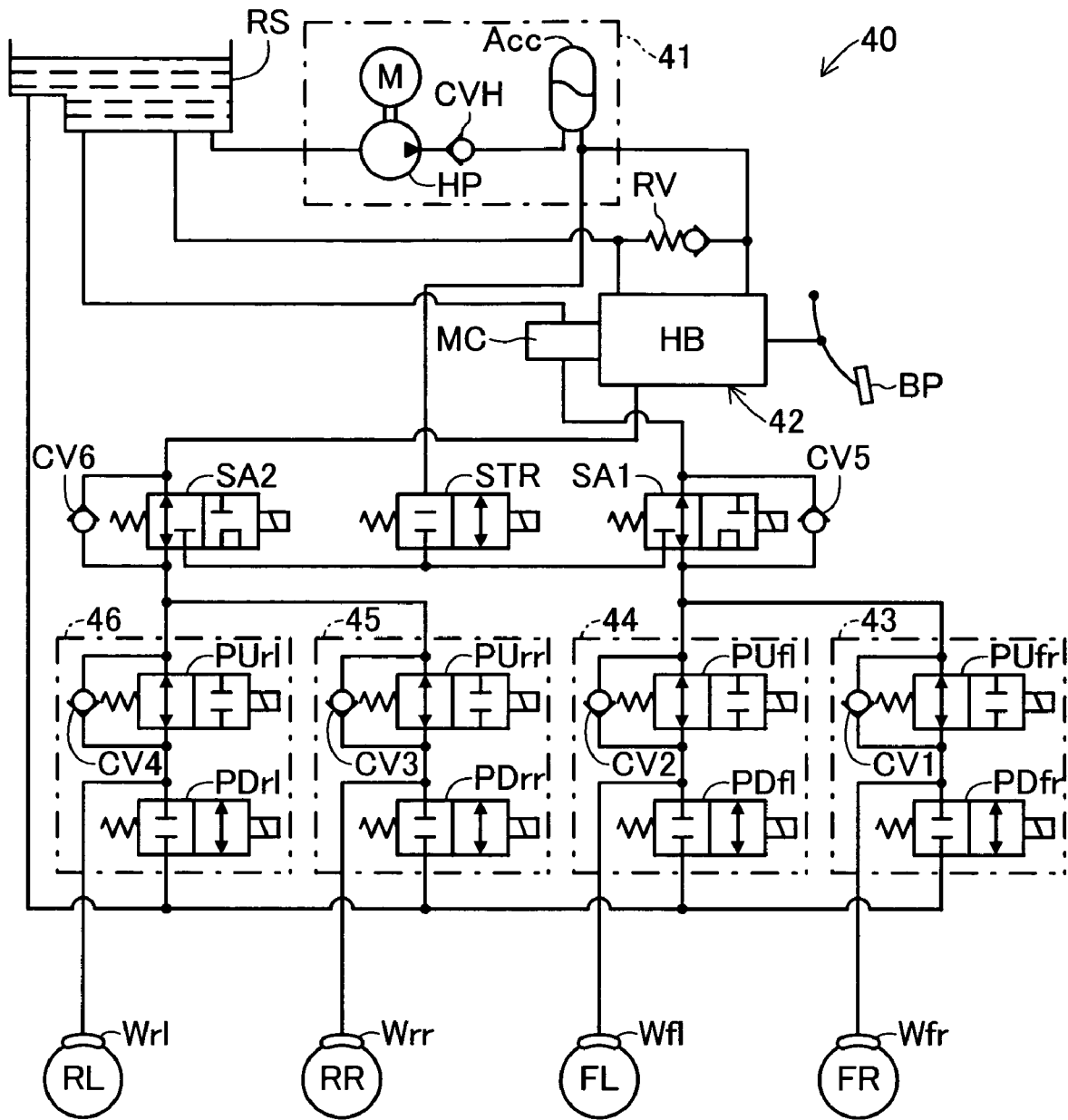
FIG. 2 is a schematic diagram of the brake fluid pressure controller shown in FIG. 1.

As schematically shown in FIG. 2, the brake fluid pressure controller 40 includes a high pressure generating portion 41, a brake fluid pressure generating portion 42 which generates brake fluid pressure in response to the operating force of a brake pedal BP, a brake fluid pressure adjuster 43 for the front right wheel FR, a brake fluid pressure adjuster 44 for the front left wheel FL, a brake fluid pressure adjuster 45 for the rear right wheel RR, and a brake fluid pressure adjuster 46 for the rear left wheel RL which are respectively installed on wheels FR, FL, RR, and RL and can adjust the brake fluid pressure supplied to the corresponding wheel cylinders Wfr, Wfl, Wrr, and Wrl.

The high pressure generating portion 41 includes an electric motor M, a hydraulic pump HP which is driven by the electric motor M and increases the pressure of brake fluid from a reservoir RS, and an accumulator Acc which is connected to the discharge side of the hydraulic pump HP through a check valve CVH and which stores brake fluid which is increased in pressure by the hydraulic pump HP.

The electric motor M is driven when the fluid pressure in the accumulator Acc falls below a prescribed lower limit, and it stops when the fluid pressure in the accumulator Acc exceeds a prescribed upper limit. As a result, the fluid pressure in the accumulator Acc is always maintained at a high pressure within a prescribed range.

A relief valve RV is installed between the accumulator Acc and the reservoir RS. When the fluid pressure in the accumulator Acc becomes an abnormally high pressure above the above-mentioned high pressure, brake fluid within the accumulator Acc is returned to the reservoir RS. As a result, the hydraulic circuit of the high pressure generating portion 41 is protected.

The brake fluid pressure generating portion 42 includes a hydraulic booster HB which operates in response to the operation of the brake pedal BP, and a master cylinder MC which is linked to the hydraulic booster HB. The hydraulic booster HB utilizes the high pressure which is supplied from the fluid pressure high pressure generating portion 41 to assist the operating force of the brake pedal BP by a prescribed ratio and transmits the assisted operating force to the master cylinder MC.

The master cylinder MC generates a master cylinder fluid pressure corresponding to the assisted operating force. The hydraulic booster HB receives the master cylinder fluid pressure and generates a regulator fluid pressure corresponding to the assisted operating force which is approximately the same fluid pressure as the master cylinder fluid pressure. The structure and operation of the master cylinder MC and the hydraulic booster HB are well known, so an explanation of the details thereof will be omitted. In this manner, the master cylinder MC and the hydraulic booster HB respectively generate a master cylinder fluid pressure and a regulator fluid pressure in accordance with the operating force of the brake pedal BP.

A control valve SA1, which is a 3-port, 2-position solenoid valve, is disposed between the master cylinder MC and the upstream side of the brake fluid pressure adjuster 43 for the front right wheel FR and the upstream side of the brake fluid pressure fluid pressure adjuster 44 for the front left wheel FL. Similarly, a control valve SA2, which is also a 3-port, 2-position solenoid valve, is disposed between the hydraulic booster HB and the upstream side of the brake fluid pressure adjuster 45 for the rear right wheel RR and the upstream side of the brake fluid pressure fluid pressure adjuster 46 for the rear left wheel RL. A switching valve STR, which is a 2-port, 2-position, normally closed solenoid valve, is disposed between the high pressure generating portion 41 and the control valves SA1 and SA2.

When the control valve SA1 is in its first position (a position in a nonenergized state) shown in FIG. 2, it connects the master cylinder MC to the upstream side of the brake fluid pressure adjuster 43 for the front right wheel FR and the upstream side of the brake fluid pressure adjuster 44 for the front left wheel FL, and when it is in its second position (its position in an energized state), it cuts off communication between the master cylinder MC and the upstream side of the brake fluid pressure adjuster 43 for the front right wheel FR and the upstream side of the brake fluid pressure adjuster 44 for the front left wheel FL, and it connects the switching valve STR and the upstream side of the brake fluid pressure adjuster 43 for the front right wheel FR and the upstream side of the brake fluid pressure adjuster 44 for the front left wheel FL.

When the control valve SA2 is in its first position shown in FIG. 2 (the position corresponding to a nonenergized state), it connects the hydraulic booster HB to the upstream side of the brake fluid pressure adjuster 45 for the rear right wheel RR and the upstream side of the brake fluid pressure adjuster 46 for the rear left wheel RL, and when it is in its second position (the position corresponding to an energized state), it cuts off communication of the hydraulic booster HB to the upstream side of the brake fluid pressure adjuster 45 for the rear right wheel RR and the upstream side of the brake fluid pressure adjuster 46 for the rear left wheel RL, and it connects the switching valve STR to the upstream side of the brake fluid pressure adjuster 45 for the rear right wheel RR and the upstream side of the brake fluid pressure adjuster 46 for the rear left wheel RL.

As a result, when the control valve SA1 is in its first position, the master cylinder fluid pressure is supplied to the upstream side of the brake fluid pressure adjuster 43 for the front right wheel FR and the upstream side of the brake fluid pressure adjuster 44 for the front left wheel FL, and when the control valve SA1 is in its second position and the switching valve STR is in its second position (the position corresponding to an energized state), the high pressure generated in the high pressure generating portion 41 is supplied to the upstream side of the brake fluid pressure adjuster 43 and the upstream side of the brake fluid pressure adjuster 44.

Similarly, when the control valve SA2 is in its first position, the regulator fluid pressure from the hydraulic booster HB is supplied to the upstream side of the brake fluid pressure adjuster 45 for the rear right wheel RR and the upstream side of the brake fluid pressure adjuster 46 for the rear left wheel RL, and when the control valve SA2 is in its second position and the switching valve STR is in its second position, the high pressure generated in the high pressure generating portion 41 is supplied to the upstream side of the brake fluid pressure adjuster 45 and the upstream side of the brake fluid pressure adjuster 46.

The brake fluid pressure adjuster 43 for the front right wheel FR comprises a pressure increasing valve PUfr, which is a 2-port, 2-position, normally open solenoid valve, and a pressure reducing valve PDfr, which is a 2-port, 2-position, normally closed solenoid valve. When the pressure increasing valve PUfr is in its first position shown in FIG. 2 (the position corresponding to a nonenergized state), it connects the upstream side of the brake fluid pressure adjuster 43 for the front right wheel FR to the wheel cylinder Wfr, and when it is in its second position (the position corresponding to an energized state), it shuts off communication between the upstream side of the brake fluid pressure adjuster 43 for the front right wheel FR and the wheel cylinder Wfr. When the pressure reducing valve PDfr is in its first position shown in FIG. 2 (the position corresponding to a nonenergized state), it shuts off communication between the wheel cylinder Wfr and the reservoir RS, and when it is in its second position (the position corresponding to an energized state), it connects the wheel cylinder Wfr and the reservoir RS.

With this structure, when the pressure increasing valve PUfr and the pressure reducing valve PDfr are each in their first position, the brake fluid pressure inside the wheel cylinder Wfr is increased by the supply of the fluid pressure on the upstream side of the brake fluid pressure adjuster 43 for the front right wheel FR to the inside of the wheel cylinder Wfr. When the pressure increasing valve PUfr is in its second position and the pressure reducing valve PDfr is in its first position, regardless of the fluid pressure in the upstream side of the brake fluid pressure adjuster 43 for the front right wheel FR, the fluid pressure in the wheel cylinder Wfr at that time is maintained. In addition, when the pressure increasing valve PUfr and the pressure reducing valve PDfr are each in their second position, the pressure in the wheel cylinder Wfr is decreased by the return of brake fluid from within the wheel cylinder Wfr to the reservoir RS.

A check valve CV1 which allows flow of the brake fluid in only one direction from the wheel cylinder Wfr to the upstream side of the brake fluid pressure adjuster 43 for the front right wheel FR is connected in parallel with the pressure increasing valve PUfr. As a result, when the control valve SA1 is in its first position and the brake pedal BP is released after being operated, the brake fluid pressure in the wheel cylinder Wfr is rapidly decreased.

Similarly, the brake fluid pressure adjuster 44 for the front left wheel FL, the brake fluid pressure adjuster 45 for the rear right wheel RR, and the brake fluid pressure adjuster 46 for the rear left wheel RL respectively comprise a pressure increasing valve PUfl and a pressure reducing valve PDfl, a pressure increasing valve PUrr and a pressure reducing valve PDrr, and a pressure increasing valve PUrl and a pressure reducing valve PDrl. By controlling the positions of each pressure increasing valve and pressure reducing valve, the brake fluid pressure in the wheel cylinder Wfl, the wheel cylinder Wrr, and the wheel cylinder Wrl can be increased, maintained, or decreased. Checks valves CV2, CV3, and CV4 are provided in parallel with the pressure increasing valves PUfl, PUrr, and PUrl, respectively, to provide the same function as the check valve CV1.

A check valve CV5 is connected in parallel with the control valve SA1 to allow flow of brake fluid in only one direction from the upstream side to the downstream side of the control valve SA1. When the control valve SA1 is in its second position and communication is cut off between the master cylinder MC and the brake fluid pressure adjuster 43 for the front right wheel FR and the brake fluid pressure adjuster 44 for the front left wheel FL, an increase in the brake fluid pressure in the wheel cylinders Wfr and Wfl is obtained by operation of the brake pedal BP. A check valve CV6 which performs the same function as the check valve CV5 is connected in parallel with the control valve SA2.

With the structure described above, when all the solenoid valves are in their first position, the brake fluid pressure controller 40 supplies brake fluid pressure corresponding to the operating force of the brake pedal BP to each wheel cylinder. In this state, by, for example, controlling the pressure increasing valve PUrr and the pressure reducing valve PDrr, the brake fluid pressure in just the wheel cylinder Wrr can be decreased by just a prescribed amount.

When the brake pedal BP is not being operated, i.e., when it is in a released state, by utilizing the high pressure generated by the high pressure generating portion 41, the brake fluid pressure controller 40 can increase the brake fluid pressure in only the wheel cylinder Wfr by a prescribed amount, while maintaining the brake fluid pressure in the wheel cylinder Wfl by, for example, switching each of the control valve SA1, the switching valve STR, and the pressure increasing valve PUfl to its second position and controlling the pressure increasing valve PUfr and the pressure reducing valve PDfr. In this manner, regardless of the operation of the brake pedal BP, the brake fluid pressure controller 40 can independently control the brake fluid pressure in the wheel cylinder of each wheel, and it can independently apply a prescribed braking force to each wheel.

Referring again to FIG. 1, the sensor portion 50 comprises wheel speed sensors 51fl, 51fr, 51rl, and 51rr which comprise rotary encoders which each output a signal having a pulse each time the corresponding wheel FL, FR, RL, or RR rotates by a prescribed angle, a steering angle sensor 52 as a steering-member operating amount obtaining means which senses the rotational angle of the steering wheel 21 from a neutral position and outputs a signal indicating the steering angle θs, an accelerator operation sensor 53 which senses the amount of operation of the accelerator pedal AP operated by the driver and outputs a signal which indicates the amount of operation Accp of the accelerator pedal AP, an actual yaw rate sensor 54 (serving as the actual lateral acceleration related quantity obtaining means) which senses the yaw rate Yr which is the rate of change of the rotational angle of the vehicle about a vertical axis passing through the centroid of the vehicle and outputs a signal indicating the yaw rate Yr, and a brake switch 55 which senses whether the brake pedal BP is being operated by the driver and outputs a signal indicating whether brake operation is taking place.

The steering angle θs is zero when the steering wheel 21 is in its neutral position, it becomes a positive value when the steering wheel 21 is rotated in the counterclockwise direction (as seen by the driver) from the neutral position, and it becomes a negative value when the steering wheel 21 is rotated in the clockwise direction from the neutral position. The yaw rate Yr is a positive value when the vehicle is turning to the left, and it is a negative value when the vehicle is turning to the right.

The electronic controller 60 is a microcomputer including a CPU 61, a ROM 62 in which are previously stored routines (programs) which are executed by the CPU 61, tables (lookup tables and maps), constants, and the like, a RAM 63 in which the CPU 61 temporarily stores data as necessary, a backup RAM 64 which store data when the power supply is on and which maintains the stored data when the power supply is cut off, an interface 65 containing an A/D converter, and the like, the above components being interconnected by buses. The interface 65 is connected to the above sensors 51-55 and supplies signals from the sensors 51-55 to the CPU 61, and it outputs drive signals to each of the solenoid valves and the motor M of the brake fluid pressure controller 40, the throttle valve actuator 32, and the fuel injection apparatus 33 in accordance with instructions from the CPU 61.

The throttle valve actuator 32 drives the throttle valve TH so that the opening of the throttle valve TH becomes an opening corresponding to the operating amount Accp of the accelerator pedal AP, and the fuel injection apparatus 33 sprays the necessary amount of fuel so as to obtain a target air-fuel ratio (a theoretical air-fuel ratio) with respect to the air intake amount corresponding to the opening of the throttle valve TH.

Summary of Vehicle Motion Control According to the First Embodiment

A vehicle motion control apparatus 10 according to the first embodiment of the present invention first calculates a target yaw rate Yrt (deg/sec) using the following Equation (1), which is a theoretical equation expressing a prescribed rule derived from a model of vehicle motion. The target yaw rate Yrt is a positive value when the vehicle is turning to the left (when the steering angle θs (degrees) is a positive value), and it is a negative value when the vehicle is turning to the right (when the steering angle θs is a negative value). This theoretical equation calculates a theoretical value of the yaw rate when the vehicle is turning in a state in which the steering angle and the vehicle-body speed are both constant (steady circle turning).

$$Yrt=(Vso \cdot \theta s)/(n \cdot I) \cdot (1/(1+Kh \cdot Vso^2)) \quad (1)$$

In Equation (1), Vso is the estimated vehicle-body speed (km/hr), which is calculated as described below. I is the wheel base (km) of the vehicle, which is a fixed value which is determined by the vehicle body. Kh is a stability factor (hr$^2$/km$^2$), which is a fixed value determined by the vehicle body. The wheel base I and the stability factor Kh are actual specification values for the vehicle.

In Equation (1), n is a control gear ratio. As described above, the actual gear ratio, which is an actual specification value of the vehicle, is set to a constant value of 20, but when the present apparatus calculates the target yaw rate Yrt using Equation (1), the control gear ratio n, which is a control specification value and which varies in accordance with the estimated vehicle-body speed Vso and the steering angle θs, is used instead of the actual gear ratio of 20.

Figure 3:
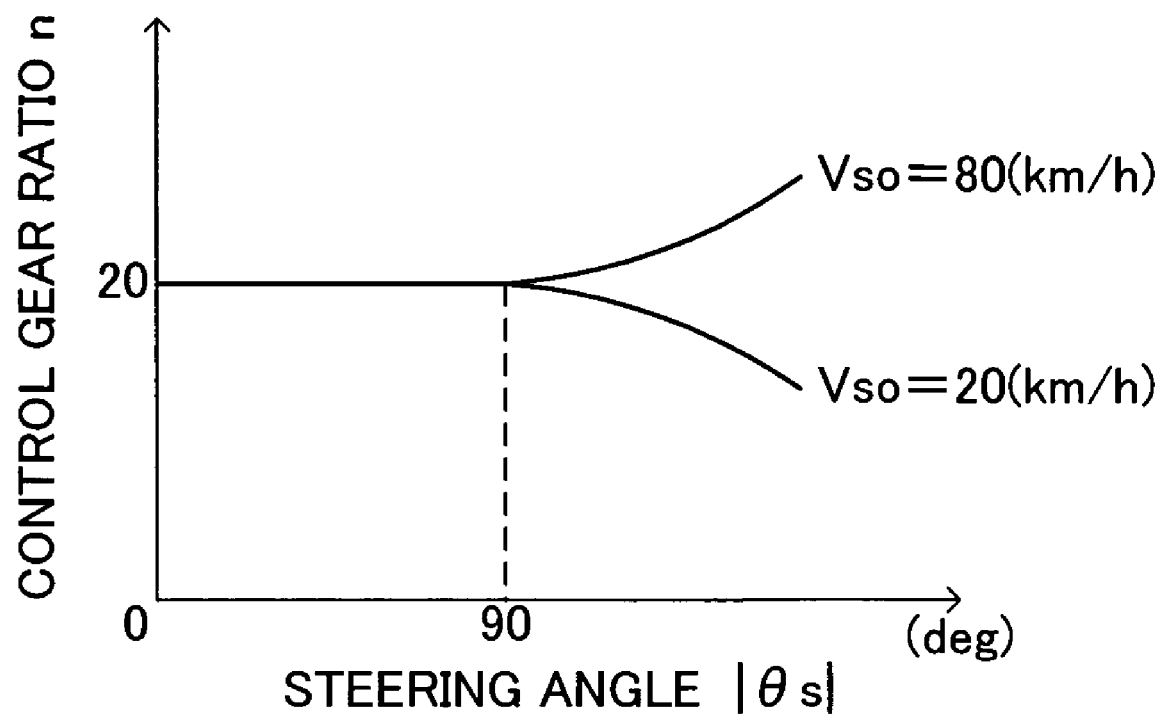
FIG. 3 is a graph showing an example of a relationship between control gear ratio, steering-member angle, and estimated vehicle-body speed, the graph being used by the CPU shown FIG. 1 to calculate a target yaw rate.

More specifically, as shown in FIG. 3 which illustrates an example of the relationship between the control gear ratio n, the steering angle θs, and the estimated vehicle-body speed Vso, when the absolute value of the steering angle θs is smaller than a prescribed angle of 90°, the control gear ratio n is set to be the same constant value of 20 as the actual gear ratio regardless of the estimated vehicle-body speed Vso. In this case, only the actual specification value for the vehicle is used when calculating the target yaw rate (i.e., the actual gear ratio of 20 is used instead of the control gear ratio n), so the reference yaw rate, which is a theoretical value of the yaw rate calculated from Equation (1), and the target yaw rate Yrt become the same value.

On the other hand, in the case where the absolute value of the steering angle θs is at least a prescribed angle of 90°, when the estimated vehicle-body speed Vso is at least a prescribed value (such as 45 km/hr) (for example, when Vso=80 km/hr as shown in FIG. 3), the control gear ratio n is set so as to be at least the actual gear ratio of 20 and increases as the absolute value of the steering angle θs increases and as the estimated vehicle-body speed Vso increases. In this case, as is clear from Equation (1), the absolute value of the target yaw rate Yrt becomes a value less than or equal to the absolute value of the reference yaw rate.

In the case where the absolute value of the steering angle θs is at least 90°, when the estimated vehicle-body speed Vso is less than the prescribed value (such as when Vso=20 km/hr as shown in FIG. 3), the control gear ratio n is set to a value of at most the actual gear ratio of 20 and decreases as the estimated vehicle-body speed Vso decreases and as the absolute value of the steering gear angle θs increases. In this case, as is clear from Equation (1), the absolute value of the target yaw rate Yrt becomes greater than or equal to the absolute value of the reference yaw rate.

In this manner, the motion control apparatus calculates the target yaw rate Yrt from Equation 1 using the control gear ratio n, which is set in the manner described above, instead of the actual gear ratio of 20.

Next, based on the following Equation (2), the motion control apparatus calculates the yaw rate deviation ΔYr (deg/sec), which is the deviation of the absolute value of the target yaw rate Yrt which is calculated in the manner described above from the absolute value of the actual yaw rate Yr (deg/sec) obtained by the yaw rate sensor 54.

$$\Delta Yr = |Yrt| - |Yr| \qquad (2)$$

When the value of the yaw rate deviation ΔYr is positive, a state exists in which the turning radius of the vehicle is larger than it would be if the yaw rate of the vehicle were the target yaw rate Yrt (referred to below as an understeering state). Therefore, the present apparatus performs understeering suppression control for suppressing the understeering state. Specifically, the present apparatus generates a prescribed braking force depending upon the value of the yaw rate deviation ΔYr in the rear wheel on the radially inner side of the turn and forcibly generates a yawing moment in the same direction as the direction of turning of the vehicle. As a result of the yawing moment, the absolute value of the actual yaw rate Yr increases, and the actual yaw rate Yr is controlled so as to approach the target yaw rate Yrt.

When the value of the yaw rate deviation ΔYr is negative, the vehicle is in a state in which the turning radius of the vehicle is smaller than it would be if the yaw rate of the vehicle were the target yaw rate Yrt (referred to below as an oversteering state). Therefore, the present apparatus performs oversteering suppression control for suppressing the oversteering state. Specifically, the present apparatus generates a prescribed braking force depending upon the value of the yaw rate deviation ΔYr in the front wheel on the radially outer side of the turn and forcibly generates a yawing moment in the opposite direction from the direction of turning of the vehicle. As a result of the yawing moment, the absolute value of the actual yaw rate Yr decreases, and the actual yaw rate Yr is controlled so as to approach the target yaw rate Yrt.

In this manner, by performing understeering suppression control or oversteering suppression control (collectively referred to below as "braking steering control"), the present apparatus controls the braking force applied to each wheel and generates a prescribed yawing moment in the vehicle in the direction such that the actual yaw rate Yr approaches the target yaw rate Yrt, which is calculated as described above. At the time of performing braking steering control, when it is necessary to also perform one of anti-skid control, front-rear braking force distribution control, and traction control, the motion control apparatus determines the braking force applied to each wheel taking into consideration the braking force applied to each wheel for carrying out any one of these types of control. The above description is a summary of the motion control of a vehicle according to the first embodiment of the present invention.

Actual Operation of the First Embodiment

The actual operation of the vehicle motion control apparatus 10 according to the first embodiment of the present invention having the above-described structure will be explained while referring to FIGS. 4-8, which show flow charts of routines which are executed by the CPU 61 of the electronic control apparatus 60. In the flow charts, the symbol  attached to the end of various variables, flags, or symbols collectively represents the symbols fl, fr, rl, and rr and indicates that the particular variable, flag, or symbol applies to all of the wheels FR, FL, etc. of the vehicle. For example, the wheel speed Vw collectively indicates the front left wheel speed Vwfl, the front right wheel speed Vwfr, the rear left wheel speed Vwrl, and the rear right wheel speed Vwrr.

Figure 4:
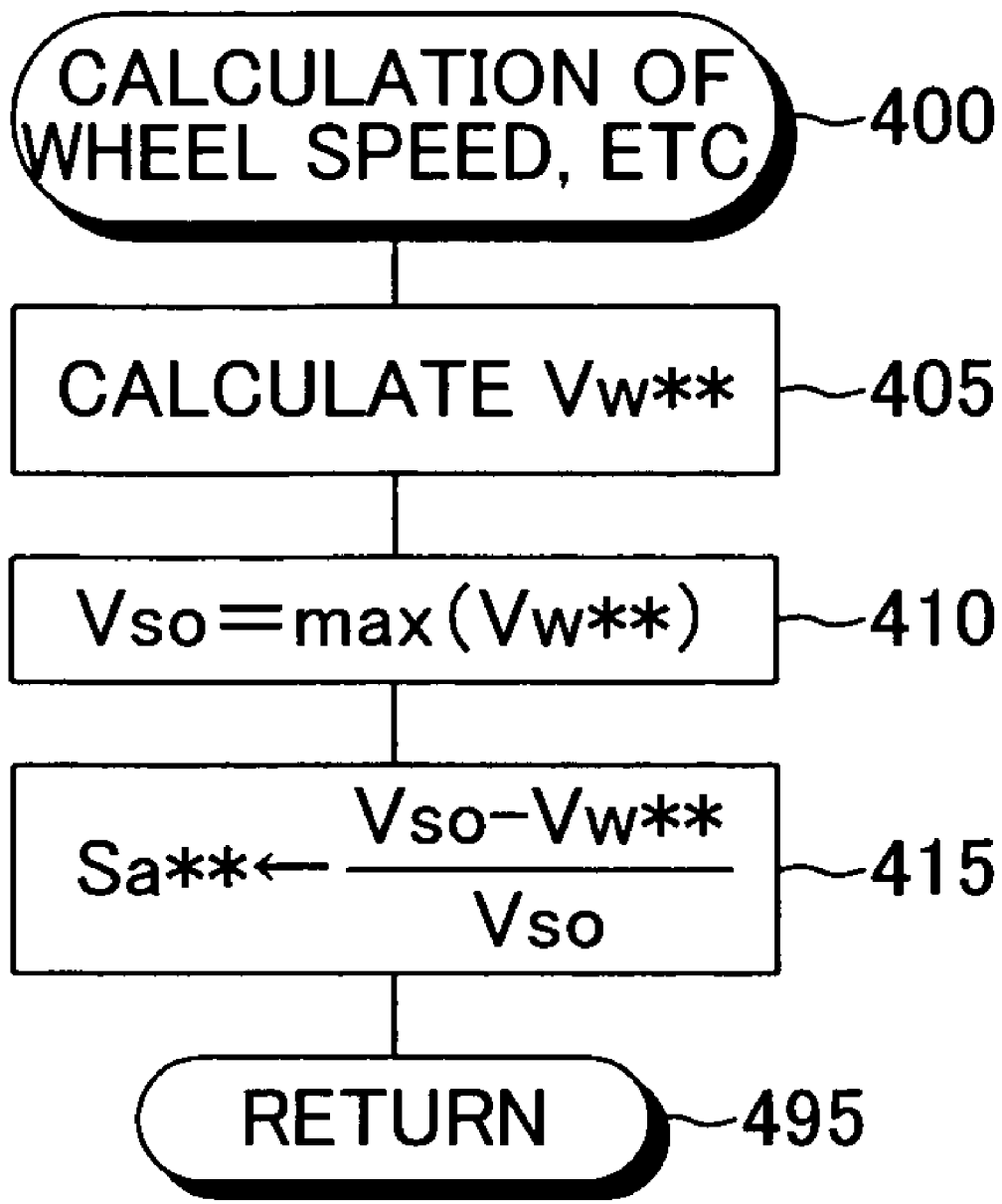
FIG. 4 is a flow chart showing a routine by which the CPU shown in FIG. 1 calculates wheel speeds and other parameters.

At prescribed time intervals, the CPU 61 repeatedly performs a routine shown in FIG. 4 for calculating the wheel speed Vw* and other parameters. At a prescribed timing, the CPU 61 starts processing of the routine from Step 400. It proceeds to Step 405 and calculates the wheel speed Vw (the speed of the outer periphery of the wheel) for each wheel FR, FL, etc. Specifically, the CPU 61 calculates the wheel speed Vw of each wheel FR, FL, etc. based on the time intervals between pulses of a signal which each wheel speed sensor 51** outputs.

Next, the CPU 61 proceeds to Step 410 and calculates the largest value of the wheel speed Vw of each wheel FR, FL, etc. as the estimated vehicle-body speed Vso. The estimated vehicle-body speed Vso may also be calculated as the average of the wheel speed Vw of each wheel FR, FL, etc. Step 410 corresponds to a vehicle-body speed obtaining means.

Next, the CPU 61 proceeds to Step 415 and calculates the actual slip rate Sa for each wheel based on the value of the estimated vehicle-body speed Vso calculated in Step 410, the value of the wheel speed Vw of each wheel FR, FL, etc. calculated in Step 405, and the equation shown in Step 415. As described below, the actual slip rate Sa** is used when calculating the braking force applied to each wheel. Then, the CPU 61 proceeds to Step 495 and performs a return to complete this routine.

Figure 5:
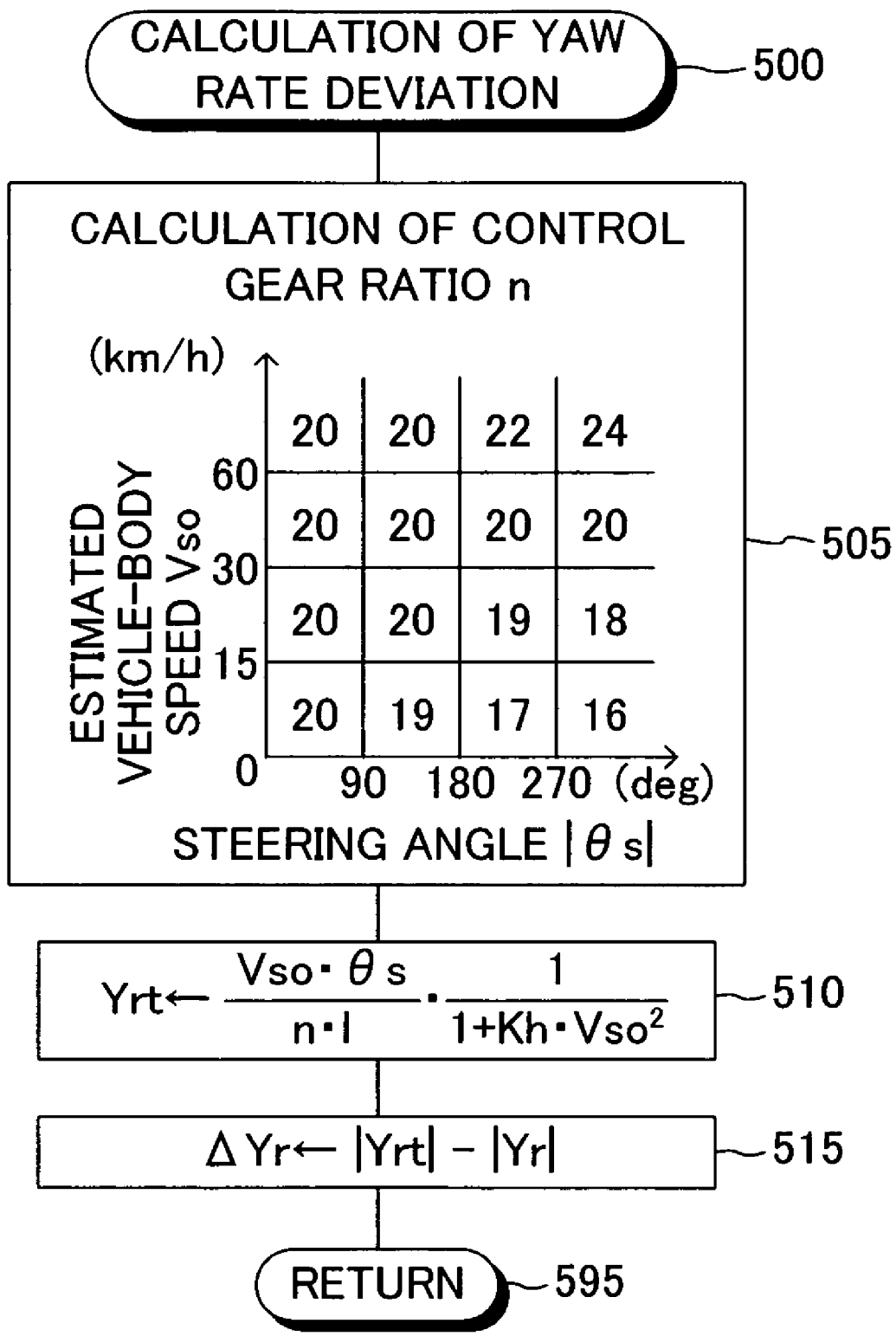
FIG. 5 is a flow chart showing a routine by which the CPU shown in FIG. 1 calculates a yaw rate deviation.

The CPU 61 calculates the yaw rate deviation by repeatedly executing the routine shown in FIG. 5 at prescribed intervals. At a prescribed timing, the CPU 61 starts processing of the routine from Step 500. It proceeds to Step 505 and calculates the control gear ratio n based on the absolute value of the steering angle θs obtained from the steering angle sensor 52, the value of the estimated vehicle-body speed Vso calculated in Step 410 of FIG. 4, and a table shown in Step 505.

As can be seen from the table, when the absolute value of the steering angle θs is less than 90°, the control gear ratio n is set to a fixed value of 20, which is the same as the actual gear ratio, regardless of the estimated vehicle-body speed Vso. In the case where the absolute value of the steering angle θs is at least 90°, when the estimated vehicle-body speed Vso is at least 45 (km/hr), the control gear ratio n is set to a value of at least the actual gear ratio of 20 and so as to increase as the absolute value of the steering angle θs increases and as the value of the estimated vehicle-body speed Vso increases. In the case where the absolute value of the steering angle θs is at least 90° and the estimated vehicle-body speed Vso is less than 45 (km/hr), the control gear ratio n is set to a value of at most the actual gear ratio of 20 and so as to decrease as the absolute value of the steering angle θs increases and as the value of the estimated vehicle-body speed Vso decreases.

Next, the CPU 61 proceeds to Step 510 and calculates the target yaw rate Yrt based on the value of the control gear ratio n calculated in Step 505, the value of the steering angle θs obtained by the steering angle sensor 52, the value of the estimated vehicle-body speed Vso calculated in Step 410 of FIG. 4, and the equation shown in Step 510, which corresponds to the right side of Equation (1). Step 510 corresponds to a target lateral acceleration related quantity calculating means.

Next, the CPU 61 proceeds to Step 515 and calculates the yaw rate deviation ΔYr based on the value of the target yaw rate Yrt calculated in Step 510, the value of the actual yaw rate obtained from the yaw rate sensor 54, and the equation shown in Step 515, which corresponds to the right side of Equation (2). The CPU 61 then proceeds to Step 595 and performs a return to complete this routine.

Next, there is described calculation of the target slip rate for each wheel necessary for determining the braking force applied to each wheel when only braking steering control is executed. The CPU 61 repeatedly executes the routine shown in FIG. 6 at prescribed intervals. At a prescribed timing, the CPU 61 begins processing of this routine from Step 600. It proceeds to Step 605 and determines whether the value of the actual yaw rate Yr obtained by the yaw rate sensor 54 is at least 0. If the value of the actual yaw rate Yr is at least 0, a determination of Yes is made in Step 605, so the CPU 61 proceeds to Step 610 and sets a turning direction indicating flag L to 1. If the value of the actual yaw rate Yr is negative, a determination of No is made in Step 605, and the CPU 61 proceeds to Step 615 and sets the turning direction indicating flag L to 0.

The turning direction indicating flag L is a flag showing whether the vehicle is turning to the left or whether the vehicle is turning to the right. When its value is 1, it indicates that the vehicle is turning to the left, and when its value is 0, it indicates that the vehicle is turning to the right. Accordingly, the direction of turning of the vehicle is specified by the value of the turning direction indicating flag L.

Next, the CPU 61 proceeds to Step 620 and calculates the control quantity G corresponding to the size of the yawing moment which should be generated in the vehicle by braking steering control based on the absolute value of the yaw rate deviation ΔYr calculated in Step 515 of FIG. 5 and the table shown in Step 620. As shown by the table shown in Step 620, when the absolute value of the yaw rate deviation ΔYr is less than or equal to a value Yr1, the control quantity G is set to 0, and when the absolute value of the yaw rate deviation ΔYr is at least the value Yr1 and less than or equal to a value Yr2, the control quantity G is set so as to vary linearly from 0 to a fixed positive value G1 as the absolute value of the yaw rate deviation ΔYr increases from the value Yr1 to the value Yr2. When the absolute value of the yaw rate deviation ΔYr is greater than or equal to Yr2, the control quantity G is set so as to be maintained at the fixed positive value G1. In other words, braking steering control is not carried out when the absolute value of the yaw rate deviation ΔYr is less than or equal to the value Yr1, whereas when the absolute value of the yaw rate deviation ΔYr is greater than or equal to the value Yr1, the control quantity G is determined in accordance with the absolute value of the yaw rate deviation ΔYr based on the table shown in Step 620.

Next, the CPU 61 proceeds to Step 625 and determines whether the value of the yaw rate deviation ΔYr calculated in Step 515 of FIG. 5 is at least 0. If the value of the yaw rate deviation ΔYr is at least 0, the CPU 61 determines as described above that the vehicle is in an understeering state, and it proceeds to Step 630 for calculating the target slip rate for each wheel for carrying out the above-described understeering suppression control, and it determines whether the value of the turning direction indicating flag L is 1.

In the determination of Step 630, if the turning direction indicating flag L is 1, the CPU 61 proceeds to Step 635, and it sets the target slip rate Strl of the rear left wheel RL to a value equal to a coefficient Kr, which is a fixed positive value, multiplied by the value of the control quantity G calculated in Step 620. In addition, the target slip rates Stfl, Stfr, and Strr of the other wheels FL, FR, and RR are all set to 0. The CPU 61 then proceeds to Step 695 and performs a return to complete this routine. As a result, a target slip rate corresponding to the absolute value of the yaw rate deviation ΔYr is set for only the rear left wheel RL, which is the rear wheel on the radially inner side of a turn when the vehicle is turning to the left.

On the other hand, when the turning direction indicating flag L is determined to be 0 in Step 630, the CPU 61 proceeds to Step 640 and sets the target slip rate Strr for the rear right wheel RR to a value equal to the above-mentioned coefficient Kr multiplied by the value of the control quantity G calculated in Step 620. In addition, it sets the target slip rates Stfl, Stfr, Strl for all the other wheels FL, FR, and RL to 0. The CPU 61 then proceeds to Step 695 and performs a return to complete this routine. As a result, a target slip rate corresponding to the absolute value of the yaw rate deviation ΔYr is set for only the rear right wheel RR, which is the rear wheel on the radially inner side of a turn when the vehicle is turning to the right.

When the yaw rate deviation ΔYr is determined to be a negative value in Step 625, the CPU 61 determines as described above that the vehicle is in an oversteering state, so it proceeds to Step 645 to calculate the target slip rate of each wheel for carrying out the above-described oversteering suppression control, and it is determined whether the value of the turning direction indicating flag L is 1.

If the turning direction indicating flag L is determined to be 1 in Step 645, the CPU 61 proceeds to Step 650 and sets the target slip rate Stfr of the front right wheel FR to a value equal to a coefficient Kf, which is a fixed positive value, multiplied by the value of the control quantity G calculated in Step 620. In addition, it sets the target slip rates Stfl, Strl, and Strr of all the other wheels FL, RL, and RR to 0. The CPU 61 then proceeds to Step 695 and performs a return to complete this routine. As a result, a target slip rate corresponding to the absolute value of the yaw rate deviation ΔYr is set for only the front right wheel FR, which is the front wheel on the radially outer side of a turn when the vehicle is turning to the left.

On the other hand, when the turning direction indicating flag L is determined to be 0 in Step 645, the CPU 61 proceeds to Step 655 and sets the target slip rate Stfl for the front left wheel FL to a value equal to the above-mentioned coefficient Kf multiplied by the value of the control quantity G calculated in Step 620. In addition, it sets the target slip rates Stfr, Strl, Strr for all the other wheels FR, RL, and RR to 0. The CPU 61 then proceeds to Step 695 and performs a return to complete this routine. As a result, a target slip rate corresponding to the absolute value of the yaw rate deviation ΔYr is set for only the front left wheel FL, which is the front wheel on the radially outer side of a turn when the vehicle is turning to the right. In this manner, the target slip rate for each wheel necessary for determining the braking force to be applied to each wheel when carrying out only braking steering control is determined.

Next, setting the control mode of the vehicle will be described. The CPU 61 repeatedly performs the routine shown in FIG. 7 at predetermined intervals. At a prescribed timing, the CPU 61 starts processing from Step 700. It proceeds to Step 705 and determines whether anti-skid control is necessary at the present time. Anti-skid control is control which decreases the braking force in a specified wheel when the specified wheel is locked when the brake pedal BP is being operated. The details of anti-skid control are well known, so an explanation of the details will be omitted here.

Specifically, in Step 705, when the brake switch 55 indicates that the brake pedal BP is being operated and the value of the actual slip rate Sa** for a specified wheel calculated in Step 415 of FIG. 4 is at least a prescribed positive value, the CPU 61 determines that anti-skid control is necessary.

When it is determined in Step 705 that anti-skid control is necessary, the CPU 61 proceeds to Step 710 and sets the value of the variable Mode to 1 to set the control mode for performing both braking steering control and anti-skid control. The CPU 61 then proceeds to Step 750.

When it is determined in Step 705 that anti-skid control is not necessary, the CPU 61 proceeds to Step 715 and determines whether front-rear braking force distribution control is necessary at the present time. Front-rear braking force distribution control is a form of control which decreases the ratio (the distribution) of the braking force for the rear wheels with respect to the braking force for the front wheels in accordance with the magnitude of the deceleration in the fore and aft direction of the vehicle during a state in which the brake pedal BP is being operated. The details of front-rear braking force distribution control are well known, so an explanation of the details thereof will be omitted here.

Specifically, in Step 715, when the brake switch 55 indicates that the brake pedal BP is being operated and the differential with respect to time of the estimated vehicle-body speed Vso which is calculated in Step 410 of FIG. 4 is a negative value and the absolute value of the differential is at least a prescribed value, the CPU 61 determines that front-rear braking force distribution control is necessary.

If it is determined in Step 715 that front-rear braking force distribution control is necessary, the CPU 61 proceeds to Step 720, it sets the value of the variable Mode to 2 to set the control mode to one for performing both braking steering control and front-rear braking force distribution control, and then it proceeds to Step 750.

When it is determined in Step 715 that front-rear braking force distribution control is not necessary, the CPU 61 proceeds to Step 725 and determines whether traction control is necessary at the present time. Traction control is control which increases the braking force to a specified wheel or decreases the drive force of the engine 31 when spinning of a specified wheel occurs in the direction in which a drive force is generated by the engine 31 when the brake pedal BP is not being operated. The details of traction control are well known, so an explanation of the details thereof will be omitted here.

Specifically, in Step 725, when it is indicated by the brake switch 55 that the brake pedal BP is not being operated and when the actual slip rate Sa of a specified wheel calculated in Step 415 of FIG. 4 is a negative value and the absolute value of the actual slip rate Sa is at least a prescribed value, the CPU 61 determines that traction control is necessary.

If it is determined in Step 725 that traction control is necessary, the CPU 61 proceeds to Step 730, it sets the value of the variable Mode to a value of 3 for setting the control mode to perform both braking steering control and traction control, and it proceeds to Step 750.

If it is determined in Step 725 that traction control is not necessary, the CPU 61 proceeds to Step 735 and determines whether the above-described braking steering control is necessary at the present time. Specifically, in Step 735, when the absolute value of the yaw rate deviation $\Delta Yr$ calculated in Step 515 of FIG. 5 is greater than or equal to the value Yr1 in the table shown in Step 620 of FIG. 6, a specified wheel exists for which the value of the target slip rate St** set in FIG. 6 is not 0, so it is determined that braking steering control is necessary.

In Step 735, if it is determined that braking steering control is necessary, the CPU 61 proceeds to Step 740, it sets the value of the variable Mode to 4 to set the control mode so as to perform only braking steering control, and then it proceeds to Step 750. On the other hand, if it is determined in Step 735 that braking steering control is not necessary, the CPU 61 proceeds to Step 745, it sets the value of the variable Mode to 0 to set a noncontrolled mode in which motion control of the vehicle is not carried out, and then it proceeds to Step 750. In this case, a specified wheel which should be controlled does not exist.

When the CPU 61 proceeds to Step 750, it sets the flag CONT for the wheels to be controlled to 1, and it sets the flag CONT for the noncontrolled wheels which are not controlled to 0. The wheels to be controlled in Step 750 are wheels for which it is necessary to control at least one of the pressure increasing valves PU and the pressure reducing valves PD shown in FIG. 2.

Figure 6:
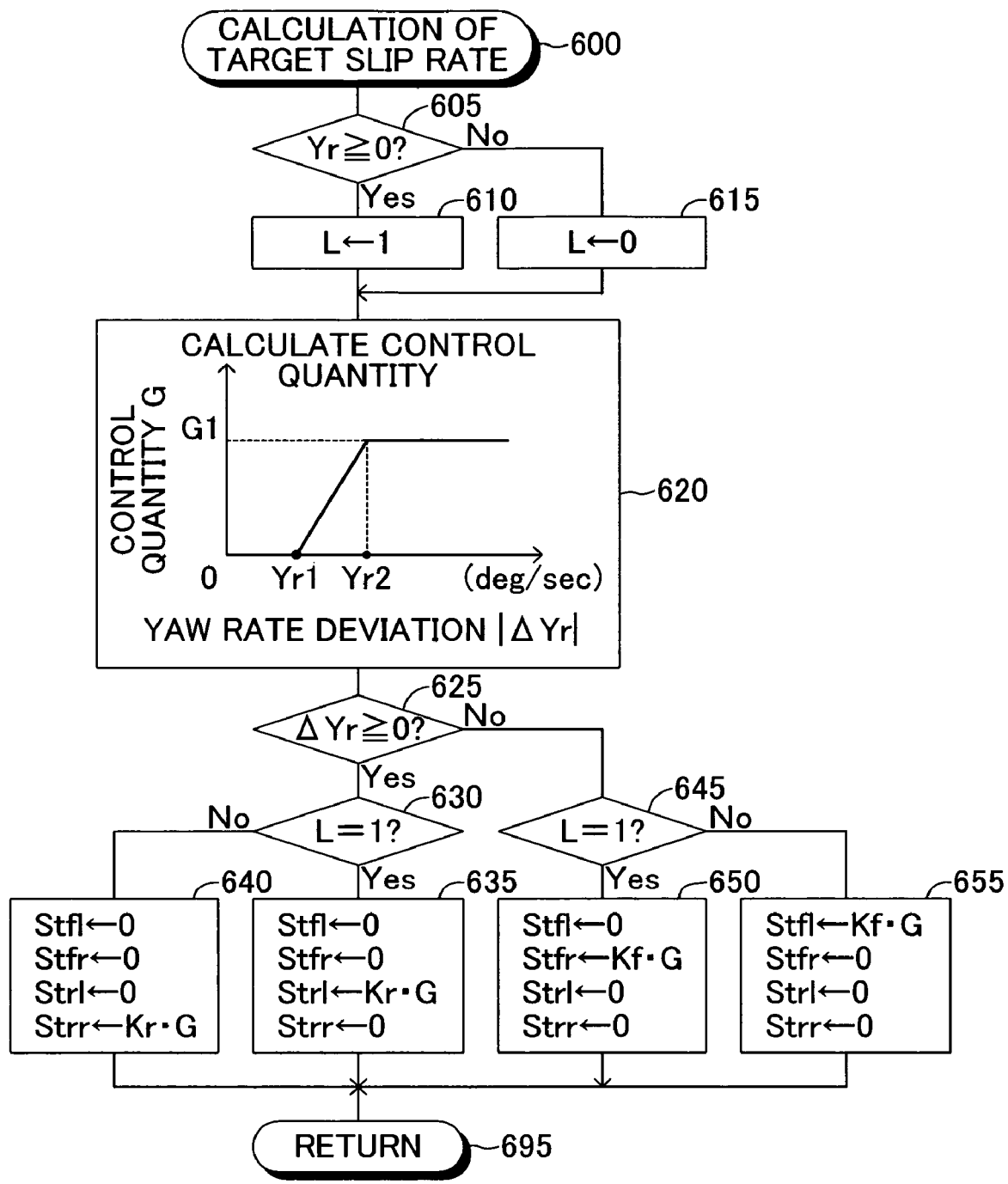
FIG. 6 is a flow chart showing a routine by which the CPU of shown in FIG. 1 calculates a target slip rate.

Accordingly, when, for example, the brake pedal BP is not being operated and Step 650 of FIG. 6 is proceeded to, it is necessary to increase only the brake fluid pressure of the wheel cylinder Wfr for the front right wheel FR. Therefore, by switching each of the control valve SA1, the switching valve STR, and the pressure increasing valve PUfl shown in FIG. 2 to its second position and controlling each of the pressure increasing valve PUfr and the pressure reducing valve PDfr, the brake fluid pressure only in the wheel cylinder Wfr is increased by utilizing the high pressure generated by the high pressure generating portion 41, while the brake fluid pressure in the wheel cylinder Wfl is maintained. Accordingly, in this case, the wheels to be controlled include not only the front right wheel FR but also the front left wheel FL. After the CPU 61 executes Step 750, it proceeds to Step 795 and performs a return to complete this routine. In this manner, the control mode is specified, and the wheels to be controlled are also specified.

Next, control of the braking force applied to each wheel will be described. The CPU 61 repeatedly executes the routine shown in FIG. 8 at prescribed intervals. At a prescribed timing, the CPU 61 starts processing from Step 800, and it proceeds to Step 805 to determine whether the value of the variable Mode is 0. If the value of the variable Mode is 0, the CPU 61 makes a determination of No in Step 805 and proceeds to Step 810, in which it sets all of the solenoid valves in the brake fluid pressure controller 40 to OFF (a nonenergized state) because it is not necessary to perform brake control with respect to any wheel. The CPU 61 then proceeds to Step 895 and performs a return to complete this routine. As a result, a brake fluid pressure corresponding to the operating force applied to the brake pedal BP by the driver is supplied to each wheel cylinder W**.

On the other hand, if it is determined in Step 805 that the value of the variable Mode is not 0, the CPU 61 makes a determination of Yes in Step 805 and proceeds to Step 815, where it determines whether the value of the variable Mode is 4. If the value of the variable Mode is not 4 (namely, if anti-skid control or other type of control other than braking steering control is necessary), the CPU 61 makes a determination of No in Step 815 and proceeds to Step 820. In Step 820, for each wheel for which the value of the flag CONT was set to 1 in Step 750 of FIG. 7, the CPU 61 corrects the value of the target slip rate St which was set in FIG. 6 and which is necessary when performing only braking steering control. The CPU 61 then proceeds to Step 825. As a result, the slip rate St** which was already set in FIG. 6 is corrected for each of the wheels to be controlled by just the amount of the target slip rate for each wheel which is necessary when performing a type of control corresponding to the value of the variable Mode in addition to braking steering control.

When the value of the variable Mode is determined to be 4 in Step 815, the CPU 61 makes a determination of Yes in Step 815, and as it is not necessary to correct the target slip rate St for each wheel which was already set in FIG. 6, the CPU 61 proceeds directly to Step 825. In Step 825, the CPU 61 calculates the slip rate deviation ΔSt for the wheels to be controlled for which the flag CONT was set to 1 in Step 750 of FIG. 7 based on the value of the target slip rate St, the value of the actual slip rate Sa** calculated in Step 415 of FIG. 4, and the formula shown in Step 825.

The CPU 61 then proceeds to Step 830 and sets the fluid pressure control mode for each wheel to be controlled, i.e., for each wheel for which CONT=1. Specifically, based on the value of the slip rate deviation ΔSt for each wheel to be controlled which was calculated in Step 825 and the table shown in Step 830, the CPU 61 sets the fluid pressure control mode to "increase pressure" for each wheel to be controlled when the value of the slip rate deviation ΔSt exceeds a prescribed positive reference value, it sets the fluid pressure control mode to "maintain" when the value of the slip rate deviation ΔSt is greater than or equal to a prescribed negative reference value and at most the above-described positive reference value, and it sets the fluid pressure control mode to "decrease pressure" when the value of the slip rate deviation ΔSt** falls below the above-described prescribed negative reference value.

The CPU 61 then proceeds to Step 835, and based on the fluid pressure control mode for each wheel to be controlled which was set in Step 830, it controls the control valves SA1, SA2 and the switching valve STR shown in FIG. 2, and it controls the pressure increasing valves PU and the pressure reducing valves PD in accordance with the fluid pressure control mode for each wheel to be controlled.

Specifically, the CPU 61 controls the pressure increasing valve PU and the pressure reducing valve PD to its first position (the position of a nonenergized state) for each wheel for which the fluid pressure mode is "increase pressure", it controls the pressure increasing valve PU to its second position (the position of an energized state) and it controls the pressure reducing valve PD to its first position for each wheel for which the fluid pressure control mode is "maintain", and it controls both the pressure increasing valve PU and the pressure reducing valve PD to its second position (the position of an energized state) for each wheel for which the fluid pressure control mode is "decrease pressure".

Figure 7:
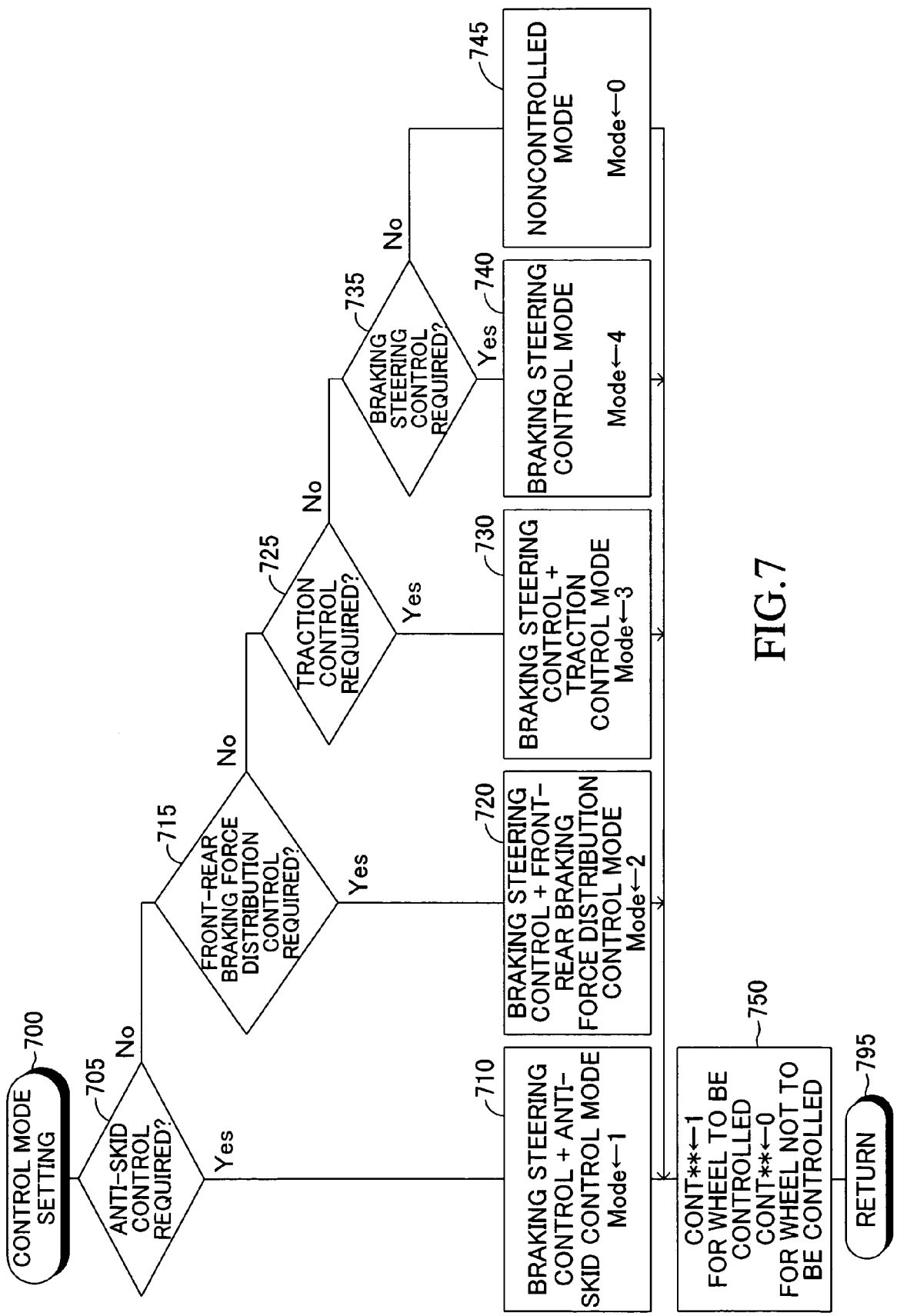
FIG. 7 is a flow chart showing a routine by which the CPU shown in FIG. 1 sets the control mode.
Figure 8:
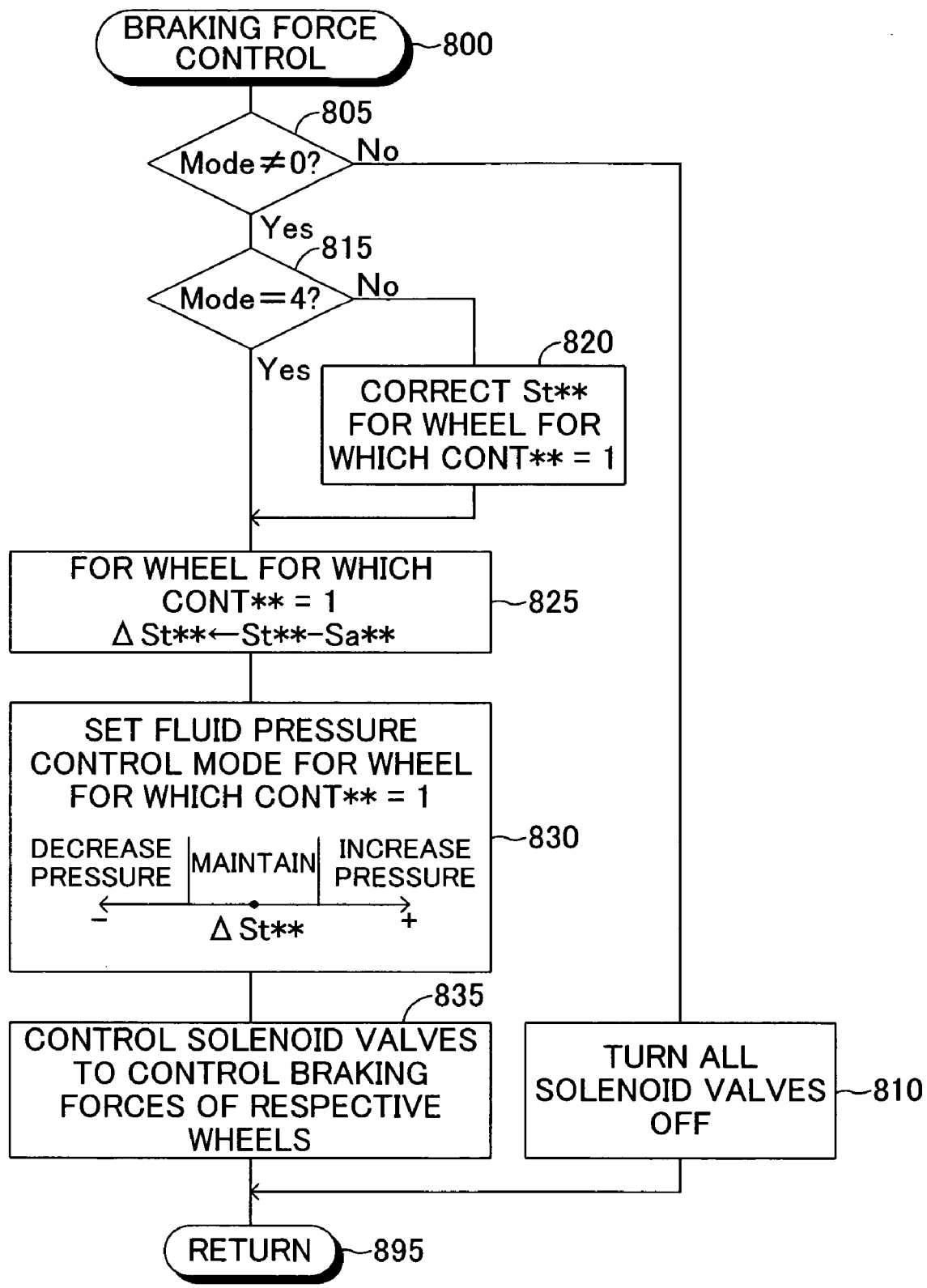
FIG. 8 is a flow chart showing a routine by which the CPU shown in FIG. 1 controls the braking force applied to each wheel of the vehicle.

As a result, the brake fluid pressure in the wheel cylinders W of the wheels to be controlled for which the fluid pressure control mode is "increase pressure" increases, and the brake fluid pressure in the wheel cylinders W of the wheels to be controlled for which the fluid pressure control mode is "decrease pressure" decreases, and the actual slip rate Sa of each controlled wheel is controlled, so as to approach the target slip rate St. As a result, control corresponding to the control mode set in FIG. 7 is achieved. Step 835 corresponds to a braking force control means.

When the control mode which is set by performing the routine of FIG. 7 is the control mode for performing traction control (the value of the variable Mode=3) or the control mode for performing only braking steering control (the value of the variable Mode=4), in order to decrease the drive force of the engine 31, if necessary, the CPU 61 controls the throttle valve actuator 32 so that the opening of the throttle valve TH is a smaller opening by just a prescribed amount than an opening corresponding to the operating amount Accp of the accelerator pedal AP. Then, the CPU 61 proceeds to Step 895 and performs a return to complete this routine.

As described above, according to the motion control apparatus for a vehicle according to the first embodiment of the present invention, when the estimated vehicle-body speed Vso is at least a prescribed value (45 km/hr), the target yaw rate (its absolute value) is set to a value not greater than the above-described reference yaw rate (its absolute value) which is a theoretical value based on a theoretical formula derived from a model of vehicle motion, and when the estimated vehicle-body speed Vso is less than the above-mentioned prescribed value, the target yaw rate Yrt (its absolute value) is set to be at least the reference yaw rate (its absolute value). Then, the target slip rate St of each wheel of the vehicle is set such that the actual yaw rate Yr approaches the target yaw rate Yrt, and the braking force for each wheel is controlled such that the actual slip rate Sa of each wheel becomes the target slip rate St**. Accordingly, in the case where the vehicle is turning or when it is starting to turn, when the estimated vehicle-body speed Vso is at least a prescribed value, the generation of excessive rolling of the vehicle is prevented and the stability of the vehicle is secured, as compared to the case in which the braking force of each wheel is controlled so as to generate the reference yaw rate in the vehicle. On the other hand, when the estimated vehicle-body speed Vso is less than a prescribed value, the turning and tracing ability of the vehicle is increased as compared to the case in which the braking force of each wheel is controlled so that the vehicle generates the reference yaw rate.

The amount of deviation of the target yaw rate Yrt from the reference yaw rate is set so as to increase as the absolute value of the steering angle θs increases. Therefore, in accordance with the extent to which the turning and tracing ability of the vehicle decreases during low-speed travel and the degree of generation of excessive rolling during high-speed travel, the extent to which the turning and tracing ability of the vehicle is increased and the extent to which the generation of excessive rolling is prevented are set properly, and as a result, the state of motion of the vehicle (the state of turning motion) can be made to more closely approach an ideal state.

The target yaw rate Yrt is calculated based on the above-described theoretical formula using the control gear ratio n, which is deviated from the actual gear ratio (20), instead of the actual gear ratio (20) of the vehicle. Previously predicting and estimating the extent of the change in the motion properties (turning properties) of the vehicle when the gear ratio is varied is relatively easy. Accordingly, the motion control apparatus for a vehicle according to the present invention enables the time required for tuning and determining the value of the control gear ratio n through tests of each type of vehicle and vehicle simulations to be shortened, and the number of man hours required for the design and development stage of a motion control apparatus for a vehicle can be decreased.

The present invention is not restricted to the above-described first embodiment, and various modifications can be made within the scope of the present invention. For example, in the above-described first embodiment, the slip rate of each wheel of the vehicle is used as a control target for making the actual yaw rate Yr approach the target yaw rate Yrt, but any physical quantity may be used as a control target as long as it is a physical quantity which changes in accordance with the braking force applied to each wheel, such as the brake fluid pressure in the wheel cylinder W** of each wheel.

In the above-described first embodiment, the target yaw rate Yrt is calculated based on the above-described theoretical formula using the control gear ratio n instead of the actual gear ratio of 20. However, the target yaw rate Yrt may be calculated based on the above-described theoretical formula using a control stability factor which deviates in accordance with the estimated vehicle-body speed Vso, etc. from the value of the actual stability factor Kh instead of the actual stability factor Kh (which is a constant). In addition, the various specification values of the vehicle used in the above-described theoretical equation can be the actual specification value, and the target yaw rate Yrt may be calculated by employing new parameters which vary in accordance with the estimated vehicle-body speed Vso, etc. in the above-described theoretical equation.

Second Embodiment

Next, a vehicle motion control apparatus according to a second embodiment of the present invention will be described. This vehicle motion control apparatus 10 differs from the vehicle motion control apparatus 10 according to the first embodiment in that lateral acceleration is used in place of yaw rate as the lateral acceleration related quantity, and that a different method is used so as to calculate the target lateral acceleration (related quantity).

This vehicle motion control apparatus uses a lateral acceleration sensor 54 in place of the yaw rate sensor 54 (see FIG. 1). The lateral acceleration sensor 54 serves as an actual lateral acceleration related quantity obtaining means, and detects a lateral acceleration, which is a component of actual acceleration acting on the vehicle as measured along the lateral direction of the vehicle body, and outputs a signal indicative of lateral acceleration Gy (m/s$^2$). The lateral acceleration Gy is a positive value when the vehicle is turning to the left, and it is a negative value when the vehicle is turning to the right.

Summary of Vehicle Motion Control According to the Second Embodiment

The vehicle motion control apparatus 10 according to the second embodiment of the present invention calculates a reference lateral acceleration Gybase (m/s$^2$) using the following Equation (3), which is a theoretical equation expressing a prescribed rule derived from a model of vehicle motion. The reference lateral acceleration Gybase is a positive value when the vehicle is turning to the left (when the steering angle θs (degrees) is a positive value), and it is a negative value when the vehicle is turning to the right (when the steering angle θs is a negative value). This theoretical equation calculates a theoretical value of the lateral acceleration acting on the vehicle when the vehicle is turning in a state in which the steering angle and the vehicle-body speed are both constant (steady circle turning).

$$Gybase=(Vso^2 \cdot \theta s)/(n \cdot I) \cdot (1/(1+Kh \cdot Vso^2)) \qquad (3)$$

In Equation (3), Vso is the estimated vehicle-body speed (m/s), which is calculated as described below. n is a gear ratio (constant value), which the ratio of a change in the rotation angle of the steering wheel 21 to a change in the steering angle of the steerable wheels FL and FR. I is the wheel base (m) of the vehicle, which is a fixed value determined by the vehicle body. Kh is a stability factor (hr$^2$/km$^2$), which is a fixed value determined by the vehicle body.

Figure 9:
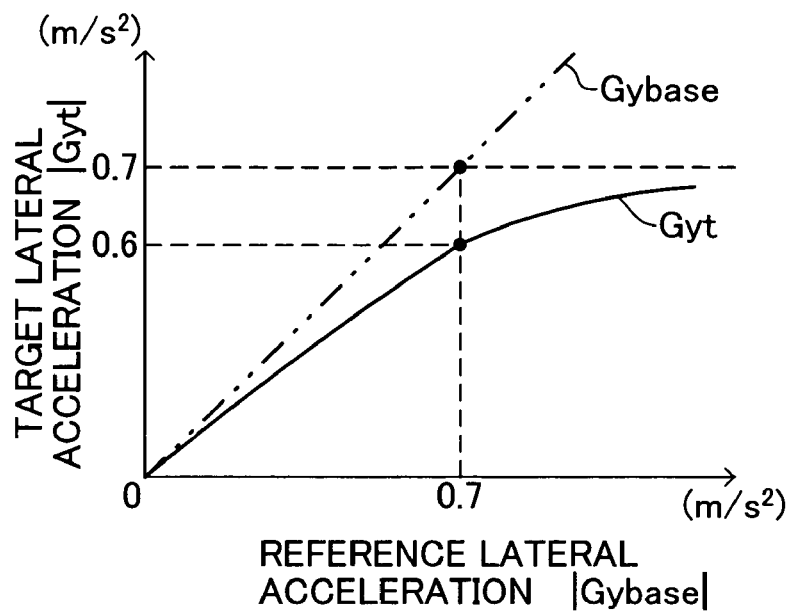
FIG. 9 is a table showing a relationship between the absolute value of target lateral acceleration and the absolute value of reference lateral acceleration, the table being used by the CPU of a motion control apparatus for a vehicle according to a second embodiment of the present invention to calculate a target lateral acceleration.

Subsequently, the present apparatus calculates a target lateral acceleration Gyt (m/s$^2$) on the basis of the absolute value of the reference lateral acceleration Gybase and with reference to the table shown in FIG. 9 and representing the relationship between the absolute value of the reference lateral acceleration Gybase and the absolute value of the target lateral acceleration Gyt. As shown in FIG. 9, the target lateral acceleration Gyt is set in such a manner that the absolute value of the target lateral acceleration Gyt is smaller than the absolute value of the reference lateral acceleration Gybase by a predetermined deviation amount, and the predetermined deviation amount is set to increase with the absolute value of the reference lateral acceleration Gybase. Further, the absolute value of the target lateral acceleration Gyt is set not to exceed "0.7" (the target lateral acceleration limiting value Gytlimit(H/T), which will be described later).

The sign of the target lateral acceleration Gyt is identical with that of the reference lateral acceleration Gybase. Accordingly, for example, when the value of the reference lateral acceleration Gybase is 0.7 (m/s$^2$), the target lateral acceleration Gyt is calculated to be 0.6 (m/s$^2$), and when the value of the reference lateral acceleration Gybase is −0.7 (m/s$^2$), the target lateral acceleration Gyt is calculated to be −0.6 (m/s$^2$).

Meanwhile, the present apparatus estimates a road-surface friction coefficient μ; i.e., the coefficient of friction of a road surface on which the vehicle is currently traveling, using the following Equation (4).

$$\mu=(DVso^2+Gy^2)^{1/2} \qquad (4)$$

In Equation (4), DVso represents an estimated vehicle-body acceleration (m/s$^2$), which is calculated as described below, and Gy represents the actual lateral acceleration (m/s$^2$), which is detected by means of the lateral acceleration sensor 54 as described above.

Figure 10:
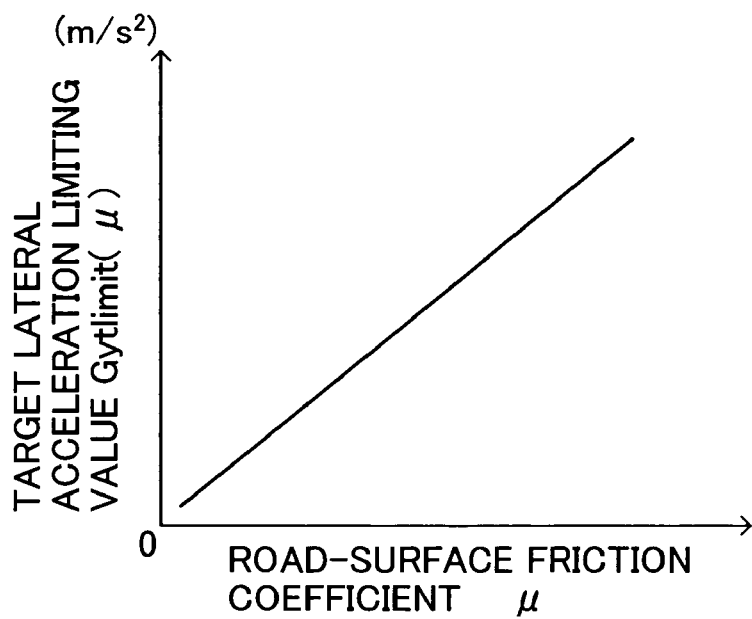
FIG. 10 is a table showing a relationship between road-surface friction coefficient and target lateral acceleration limiting value based on the road-surface friction coefficient, the table being used by the CPU of the motion control apparatus for a vehicle according to the second embodiment of the present invention to calculate the target lateral acceleration.

Further, the present apparatus calculates a target lateral acceleration limiting value Gytlimit(μ) on the basis of the value of the road-surface friction coefficient μ estimated by the above-mentioned Equation (4) and with reference to the table shown in FIG. 10 and representing the relationship between the road-surface friction coefficient μ and the target lateral acceleration limiting value Gytlimit(μ) (m/s$^2$) based on the road-surface friction coefficient μ. As shown in FIG. 10, the target lateral acceleration limiting value Gytlimit(μ) is a positive value and is calculated to linearly increase with the road-surface friction coefficient μ. The gradient of the characteristic line shown in FIG. 10 is determined through various experiments in which a value near the maximum value of the lateral acceleration which can be actually generated in the vehicle at that time in accordance with the road-surface friction coefficient μ.

Figure 11:
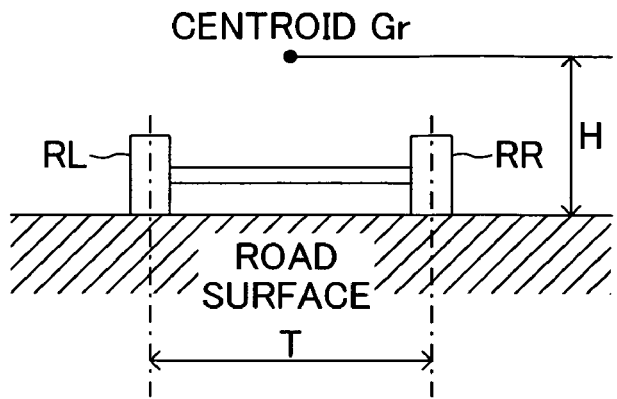
FIG. 11 is a diagram showing a wheel tread, which is the lateral distance between the center of the contact surface between the tire tread of a rear left wheel and the road surface and that of a rear right wheel, as well as the centroid height, which is the vertical distance between the centroid of the vehicle and the road surface.
Figure 12:
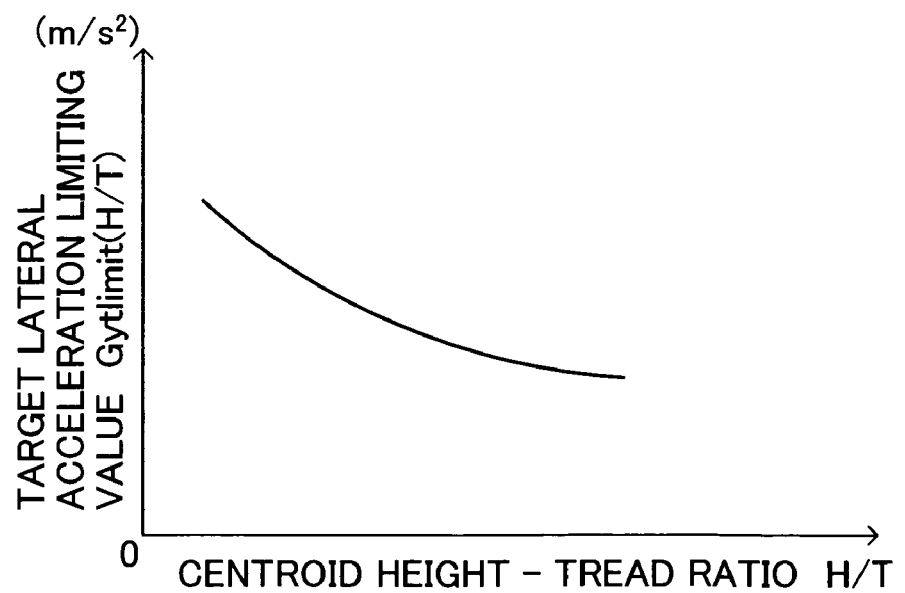
FIG. 12 is a table showing a relationship between "centroid height-tread ratio" and target lateral acceleration limiting value based on the centroid height-tread ratio, the target lateral acceleration limiting value serving as an upper limit value of the absolute value of the target lateral acceleration calculated by the CPU of the motion control apparatus for a vehicle according to the second embodiment of the present invention.

In addition, the present apparatus calculates a target lateral acceleration limiting value Gytlimit(H/T) on the basis of the "centroid height-tread ratio HIT" (the ratio of the centroid height H to the wheel tread T), which is a constant value determined by the vehicle body, and with reference to the table shown in FIG. 12 and representing the relationship between the "centroid height-tread ratio HIT" and the target lateral acceleration limiting value Gytlimit(HIT) (m/s.sup.2) based on the "centroid height-tread ratio H/T." As shown in FIG. 11, the wheel tread T represents the lateral distance between the center of the contract surface between the tire tread of the rear left wheel RL and the road surface and the center of the contact surface between the tire tread of the rear right wheel RL and the road surface. The centroid height H is the vertical distance between the centroid Gr of the vehicle and the road surface.

As shown in FIG. 12, the target lateral acceleration limiting value Gytlimit(H/T) is a positive value, and is calculated to decrease as the centroid height-tread ratio H/T increases. This is because a roll angle generated by a certain lateral acceleration increases with the "centroid height-tread ratio." The characteristic curve shown in FIG. 12 is determined through various experiments in which a near maximum value is determined within the range of the actual lateral acceleration in which the vehicle does not roll excessively, when the value of the "centroid height-tread ratio" is considered.

The "centroid height-tread ratio H/T" corresponds to the actual specification value of the vehicle which influences the magnitude of the roll angle of the vehicle. In the present embodiment, the target lateral acceleration limiting value Gytlimit(H/T) is set to "0.7" as described above, and as shown in FIG. 9, the absolute value of the target lateral acceleration Gyt does not exceed "0.7."

When the absolute value of the target lateral acceleration Gyt calculated as described above is greater than the target lateral acceleration limiting value Gytlimit($\mu$) based on the road-surface friction coefficient $\mu$, the present apparatus limits the target lateral acceleration Gyt in such a manner that the absolute value of the target lateral acceleration Gyt coincides with the target lateral acceleration limiting value Gytlimit($\mu$).

Subsequently, the present apparatus calculates a lateral acceleration deviation $\Delta$Gy (m/s$^2$), which is the deviation between the absolute value of the target lateral acceleration Gyt calculated as described above and the absolute value of the actual lateral acceleration Gy detected by means of the lateral acceleration sensor 54, using the following Equation (5).

$$\Delta Gy = |Gyt| - |Gy| \qquad (5)$$

When the value of the lateral acceleration deviation $\Delta$Gy is positive, the vehicle is in a state in which the turning radius of the vehicle is larger than it would be if the lateral acceleration of the vehicle were the target lateral acceleration Gyt (referred to below as an understeering state). Therefore, the present apparatus performs understeering suppression control for suppressing the understeering state. Specifically, the present apparatus generates a prescribed braking force depending upon the value of the lateral acceleration deviation $\Delta$Gy in the rear wheel on the radially inner side of the turn and forcibly generates a yawing moment in the same direction as the direction of turning of the vehicle. As a result of the yawing moment, the absolute value of the actual lateral acceleration Gy increases, and the actual lateral acceleration Gy is controlled so as to approach the target lateral acceleration Gyt.

When the value of the lateral acceleration deviation $\Delta$Gy is negative, the vehicle is in a state in which the turning radius of the vehicle is smaller than it would be if the lateral acceleration of the vehicle were the target lateral acceleration Gyt (referred to below as an oversteering state). In such a state, the present apparatus performs oversteering suppression control for suppressing the oversteering state. Specifically, the present apparatus generates a prescribed braking force depending upon the value of the lateral acceleration deviation $\Delta$Gy in the front wheel on the radially outer side of the turn and forcibly generates a yawing moment in the direction opposite the direction of turning of the vehicle. As a result of the yawing moment, the absolute value of the actual lateral acceleration Gy decreases, and the actual lateral acceleration Gy is controlled so as to approach the target lateral acceleration Gyt.

In this manner, by performing understeering suppression control or oversteering suppression control (collectively referred to below as "braking steering control"), the present apparatus controls the braking force applied to each wheel and generates a prescribed yawing moment in the vehicle in the direction such that the actual lateral acceleration Gy approaches the target lateral acceleration Gyt, which is calculated as described above. At the time of performing braking steering control, when it is necessary to also perform one of anti-skid control, front-rear braking force distribution control, and traction control, the present apparatus determines the braking force applied to each wheel taking into consideration the braking force applied to each wheel for carrying out any one of these types of control. The above description is a summary of motion control of the vehicle according to the second embodiment of the present invention.

Actual Operation of the Second Embodiment

The actual operation of the vehicle motion control apparatus 10 according to the second embodiment will be explained. The CPU 61 of the present apparatus executes the routines shown in FIGS. 13-15 by means of flow charts in place of the routines of FIGS. 4-6, which are executed by the CPU 61 of the first embodiment. Further, the CPU 61 of the present apparatus executes routines identical with the routines of FIGS. 7 and 8, which are executed by the CPU 61 of the first embodiment. The routines specific to the second embodiment will be described successively.

Figure 13:
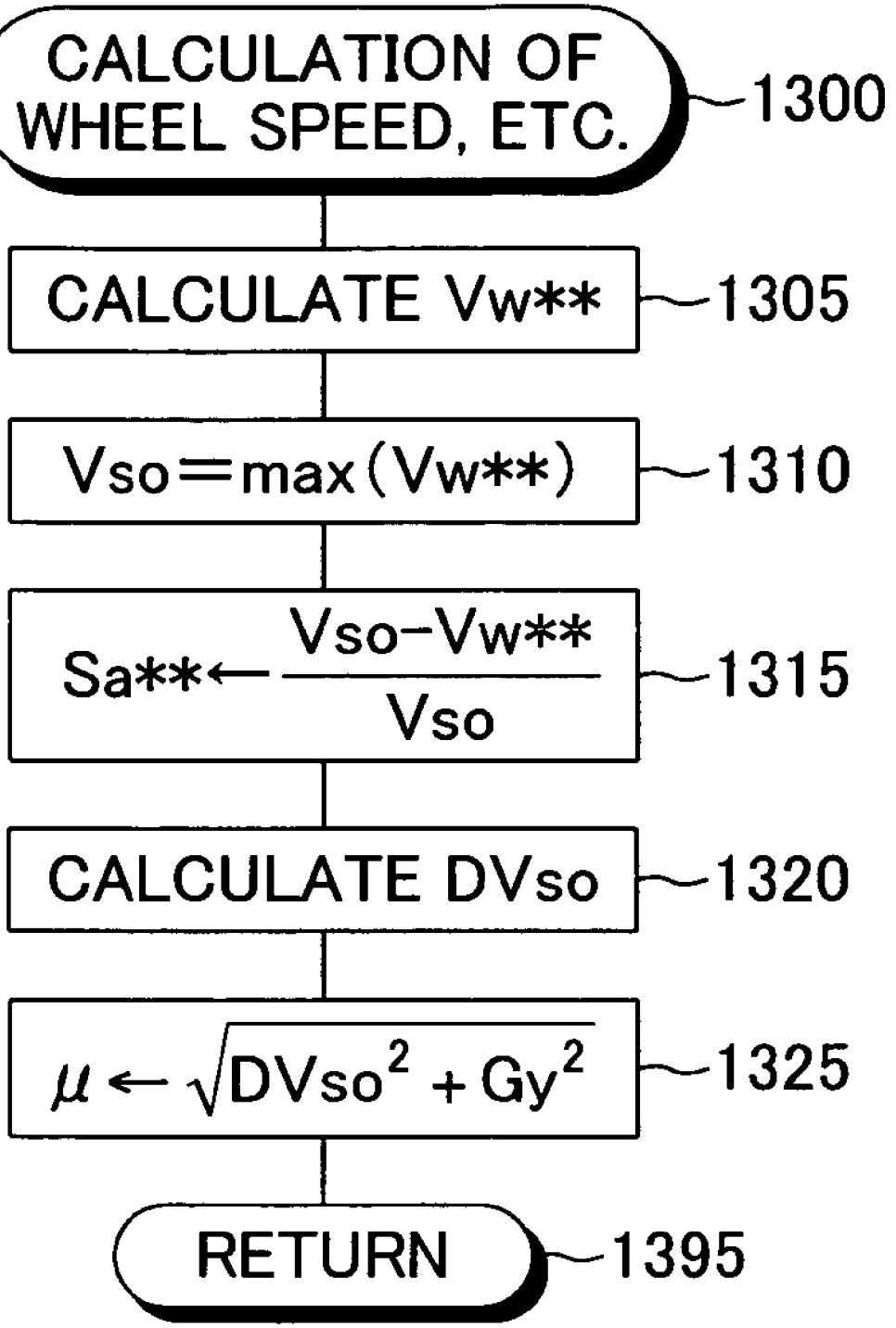
FIG. 13 is a flow chart showing a routine by which the CPU of the motion control apparatus for a vehicle according to the second embodiment of the present invention calculates wheel speeds and other parameters.
Figure 14:
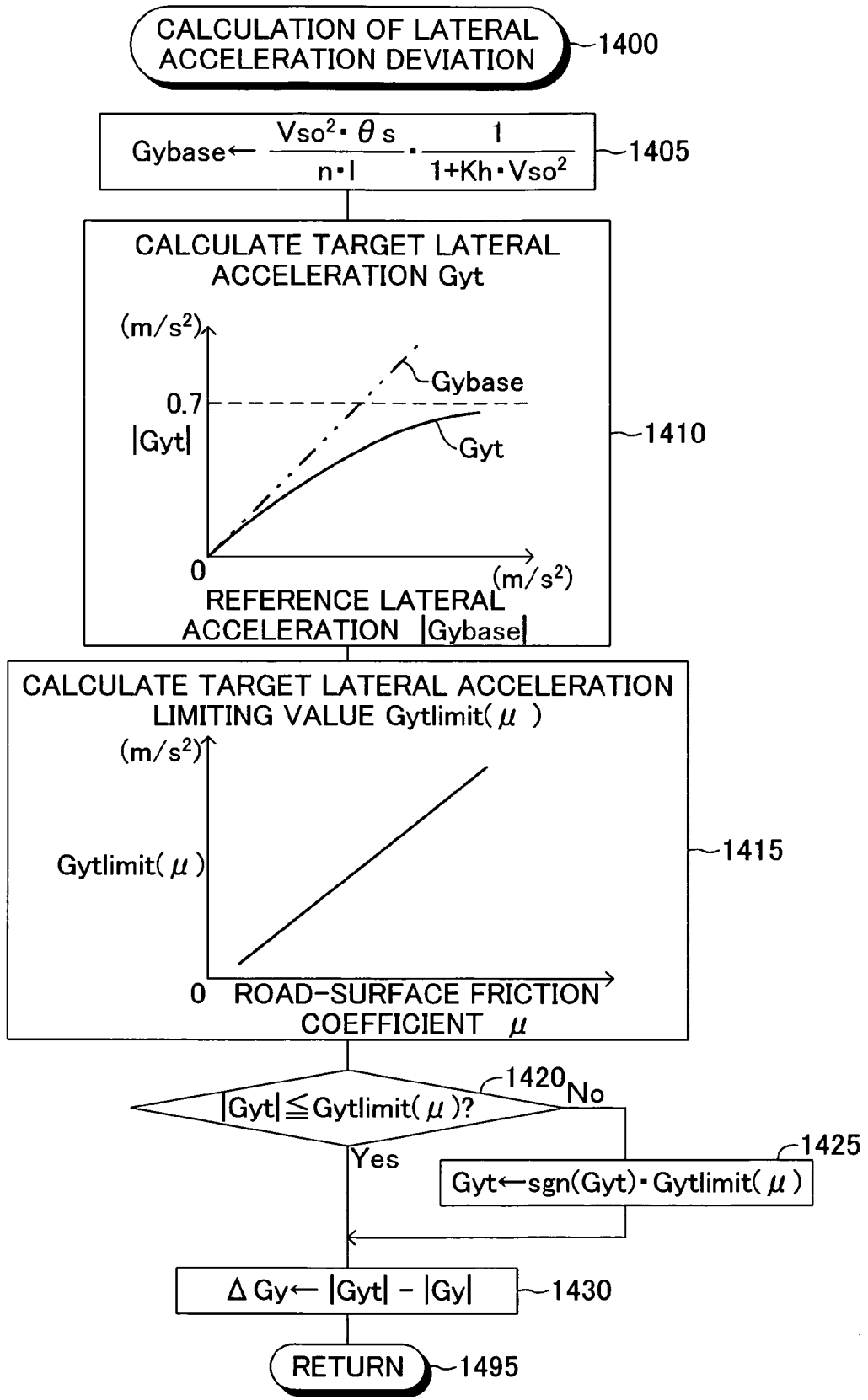
FIG. 14 is a flow chart showing a routine by which the CPU of the motion control apparatus for a vehicle according to the second embodiment of the present invention calculates a lateral acceleration deviation.

At prescribed time intervals, the CPU 61 repeatedly performs a routine shown in FIG. 13 for calculating the wheel speeds and other parameters. At a prescribed timing, the CPU 61 starts processing of the routine from Step 1300, and successively executes Steps 1305 to 1315, which are identical with Steps 405 to 415 of FIG. 4.

Subsequently, the CPU 61 proceeds to Step 1320 and calculates the estimated vehicle body acceleration DVso, which is the differential with respect to time of the estimated vehicle-body speed Vso, by making use of the following Equation (6).

$$DVso = (Vso - Vso1)/\Delta t \qquad (6)$$

In Equation (6), Vso1 is a previous estimated vehicle-body speed calculated in Step 1310 during the previous execution of the present routine; and $\Delta$t represents the above-described prescribed intervals, which correspond to the calculation period of the present routine.

Subsequently, the CPU 61 proceeds to Step 1325 and estimates the road-surface friction coefficient $\mu$ on the basis of the value of the estimated vehicle body acceleration DVso calculated in Step 132, the value of the actual lateral acceleration Gy detected by means of the lateral acceleration sensor 54, and the equation described in Step 1325, which corresponds to the right side of the above-mentioned Equation (4). Notably, Step 1325 corresponds to the road-surface friction coefficient obtaining means.

Notably, each of the value of the estimated vehicle body acceleration DVso and the value of the actual lateral acceleration Gy may be the maximum value among corresponding values obtained in the present routine lately performed a predetermined number of times. After that, the CPU 61 proceeds to Step 1395, and performs a return to complete the present routine.

Next, the calculation of the lateral acceleration deviation will be described. The CPU 61 repeatedly executes the routine shown in FIG. 14 at prescribed intervals. At a prescribed timing, the CPU 61 starts processing of the routine from Step 1400. It proceeds to Step 1405 and calculates a reference lateral acceleration Gybase on the basis of the value of the steering angle θs obtained from the steering angle sensor 52 and the value of the estimated vehicle-body speed Vso calculated in Step 1310 of FIG. 13, and by making use of the equation shown in Step 1405, which corresponds to the right side of the above-described Equation (3).

Next, the CPU 61 proceeds to Step 1410 and calculates the absolute value of the target lateral acceleration Gyt on the basis of the absolute value of the reference lateral acceleration Gybase calculated in Step 1405 and with reference to the table described in Step 1410, which is identical with the table shown in FIG. 9. Subsequently, the CPU 61 adds the sign of the reference lateral acceleration Gybase to the absolute value of the target lateral acceleration Gyt so as to obtain the target lateral acceleration Gyt. Step 1410 corresponds to the target lateral acceleration related quantity calculating means.

Subsequently, the CPU 61 proceeds to Step 1415 and calculates the target lateral acceleration liming value Gytlimit(μ) (positive value) on the basis of the value of the road-surface friction coefficient μ estimated in Step 1325 of FIG. 13 and with reference to the table described in Step 1415, which is identical with the table shown in FIG. 10.

Next, the CPU 61 proceeds to Step 1420 and determines whether the absolute value of the target lateral acceleration Gyt calculated in Step 1410 is not greater than the target lateral acceleration liming value Gytlimit(μ) based on the road-surface friction coefficient μ calculated in Step 1415. When the absolute value of the target lateral acceleration Gyt exceeds the target lateral acceleration liming value Gytlimit (μ), the CPU 61 makes a determination of No in Step 1420, and proceeds to Step 1425. In this case, the CPU 61 stores, as the target lateral acceleration Gyt, a value obtained through addition of the present sign of the target lateral acceleration Gyt to the target lateral acceleration liming value Gytlimit(μ), and then proceeds to Step 1430. Meanwhile, when the absolute value of the target lateral acceleration Gyt is not greater than the target lateral acceleration liming value Gytlimit(μ), the CPU 61 makes a determination of Yes in Step 1420, and proceeds directly to Step 1430. Step 1425 corresponds to the target lateral acceleration related quantity limiting means.

Next, the CPU 61 proceeds to Step 1430 and calculates the lateral acceleration deviation ΔGy on the basis of the value of the target lateral acceleration Gyt and the value of the actual lateral acceleration Gy obtained from the lateral acceleration sensor 54, and by making use of the equation shown in Step 1430, which corresponds to the right side of the above-described Equation (5). The CPU 61 then proceeds to Step 1495 and performs a return to complete this routine.

Next, there will be described calculation of the target slip rate for each wheel necessary for determining the braking force applied to each wheel when only the above-described braking steering control is executed. The CPU 61 repeatedly executes the routine shown in FIG. 15 at prescribed intervals.

Figure 15:
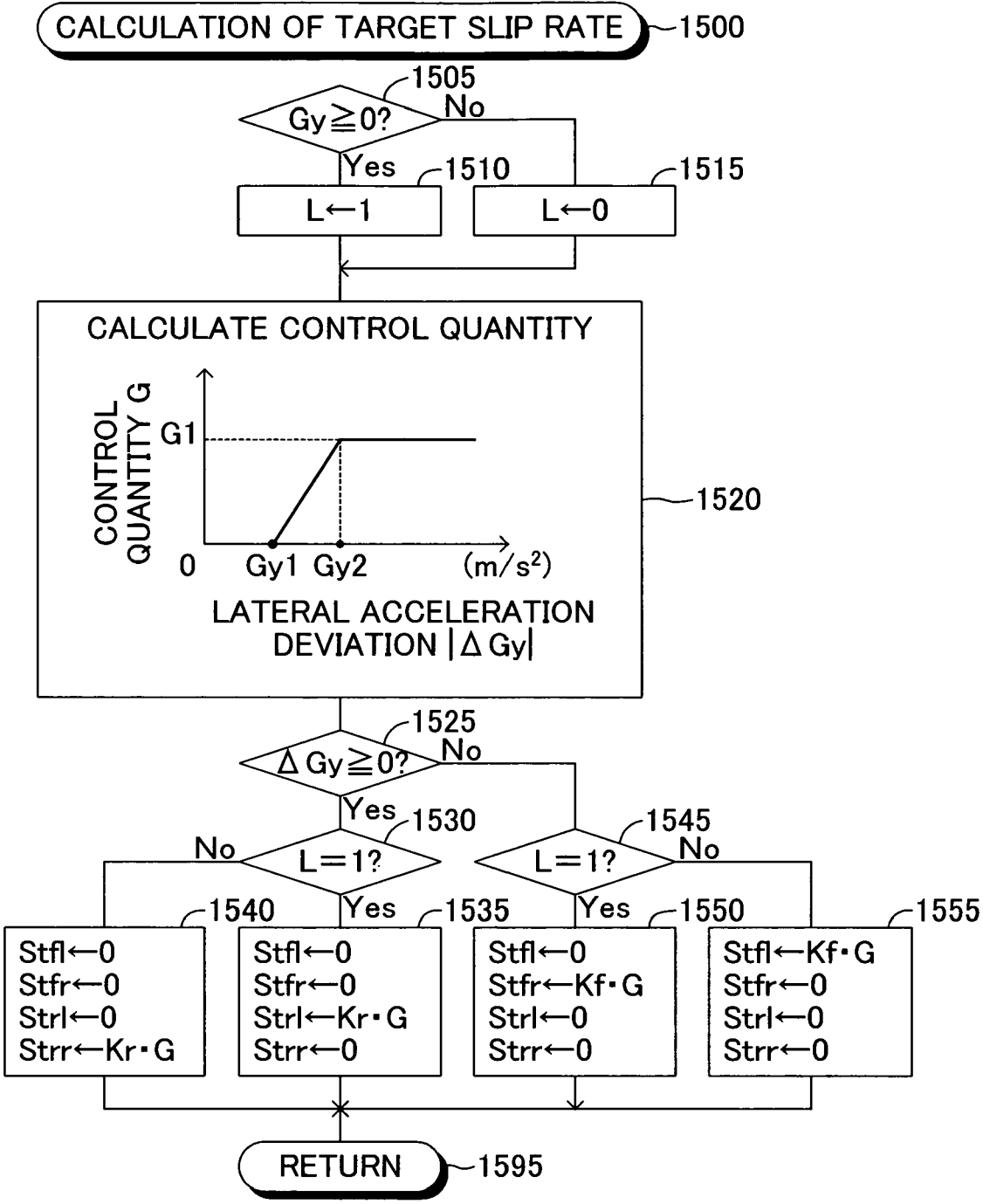
FIG. 15 is a flow chart showing a routine by which the CPU of the motion control apparatus for a vehicle according to the second embodiment of the present invention calculates a target slip rate.

Steps 1500 to 1555 and 1595 of the routine shown in FIG. 15 correspond to Steps 600 to 655 and 695 of the routine shown in FIG. 6, respectively, and the routine of FIG. 15 is generally identical with the routine of FIG. 6 except that in the routine of FIG. 15, the lateral acceleration Gy and the lateral acceleration deviation ΔGy are used in place of the yaw rate Yr and the yaw rate deviation ΔYr. Accordingly, the detail description of the routine shown in FIG. 15 will be omitted.

As described above, according to the motion control apparatus for a vehicle according to the second embodiment of the present invention, the target lateral acceleration Gyt (its absolute value) is set to a value not greater than the above-described reference lateral acceleration Gybase (its absolute value), which is a theoretical value based on a theoretical formula derived from a model of vehicle motion. Then, the target slip rate St of each wheel of the vehicle is set such that the actual lateral acceleration Gy approaches the target lateral acceleration Gyt, and the braking force for each wheel is controlled such that the actual slip rate Sa of each wheel becomes the target slip rate St**. Accordingly, in the case where the vehicle starts abrupt turning in response to, for example, abrupt steering operation by the driver and the actual lateral acceleration Gy tends to increase, the magnitude of the actual lateral acceleration Gy is immediately lowered to a value smaller than the reference lateral acceleration Gybase, through generation of a yawing moment in the vehicle in a direction for reducing the magnitude of the actual lateral acceleration Gy, whereby the vehicle is prevented from becoming unstable during turning, which unstable condition would otherwise arise due to generation of an excessive rolling of the vehicle body.

The amount of deviation of the target lateral acceleration Gyt from the reference lateral acceleration Gybase is set so as to increase as the absolute value of the reference lateral acceleration Gybase increases. Accordingly, the degree of preventing the generation of excessive rolling of the vehicle is properly set in accordance with the degree of likelihood of the vehicle body rolling excessively, whereby the state of motion of the vehicle (the state of turning motion) can be made to more closely approach an ideal state.

The absolute value of the target lateral acceleration Gyt is set to a value within the range of the lateral acceleration in which the vehicle does not roll excessively when the "centroid height-tread ratio H/T," which is the ratio of the centroid height H (the vertical distance between the centroid Gr of the vehicle and the road surface) to the wheel tread T is considered. Accordingly, generation of excessive rolling of the vehicle body can be prevented more reliably.

Moreover, when the absolute value of the target lateral acceleration Gyt is greater than the target lateral acceleration liming value Gytlimit(μ), which is set in accordance with the road-surface friction coefficient μ, the target lateral acceleration Gyt is limited in such a manner that the absolute value of the target lateral acceleration Gyt coincides with the target lateral acceleration liming value Gytlimit(μ). Therefore, the absolute value of the target lateral acceleration Gyt is limited to the range of the lateral acceleration which the vehicle can generate at that time and which depends on the road-surface friction coefficient μ. Accordingly, when the vehicles turns on a road surface whose road-surface friction coefficient μ is low, the deviation between the target lateral acceleration Gyt and the actual lateral acceleration does not become excessively large during the turning. As a result, the vehicle can be prevented from becoming unstable, which unstable condition would otherwise occur because of application of an excessively large braking force to the wheels.

The present invention is not restricted to the above-described second embodiment, and various modifications can be made within the scope of the present invention. For example, in the above-described embodiment, the slip rate of each wheel of the vehicle is used as a control target for making the actual lateral acceleration Gy approach the target lateral acceleration Gyt, but any physical quantity may be used as a control target as long as it is a physical quantity which changes in accordance with the braking force applied to each wheel, such as the brake fluid pressure in the wheel cylinder W** of each wheel.

In the above-described embodiment, as shown in FIG. 4, the target lateral acceleration liming value Gytlimit(μ) based on the road-surface friction coefficient μ is calculated so as to linearly increase with the road-surface friction coefficient μ.

However, no limitation is imposed on the relationship between the target lateral acceleration liming value Gytlimit (μ) and the road-surface friction coefficient μ insofar as the relation is set such a manner that the target lateral acceleration liming value Gytlimit(μ) increases with the road-surface friction coefficient μ.

The invention claimed is:

1. A motion control apparatus for a vehicle comprising:
vehicle-body speed obtaining means for obtaining a vehicle-body speed of the vehicle;
steering-member operating amount obtaining means for obtaining an operating amount of a steering member of the vehicle which changes a steering angle of steerable wheels of the vehicle;
actual lateral acceleration related quantity obtaining means for obtaining, as an actual lateral acceleration related quantity, an actual value of a lateral acceleration related quantity indicating the extent of turning of the vehicle;
target lateral acceleration related quantity calculating means for calculating a target lateral acceleration related quantity which is a target value of the lateral acceleration related quantity in accordance with the vehicle-body speed, in such a manner that
when the vehicle-body speed is at least a prescribed value, the absolute value of the target lateral acceleration related quantity is equal to or less than the absolute value of a reference lateral acceleration related quantity which is a reference value of the lateral acceleration related quantity determined by a prescribed rule based on at least the vehicle-body speed and the steering-member operating amount and
when the vehicle-body speed is less than the prescribed value, the absolute value of the target lateral acceleration related quantity is greater than or equal to the absolute value of the reference lateral acceleration related quantity;
wherein the reference lateral acceleration related quantity is a theoretical value of the lateral acceleration related quantity acting on the vehicle when the vehicle is turning in a state in which the steering-member operating amount and the vehicle-body speed are both constant, which theoretical value is calculated using a model of vehicle motion based on the steering-member operating amount and the vehicle-body speed; and
braking force control means for controlling a braking force applied to each of front and rear wheels of the vehicle so that the actual lateral acceleration related quantity approaches the target lateral acceleration related quantity.

2. A motion control apparatus for a vehicle according to claim 1, wherein the target lateral acceleration related quantity calculating means changes the amount by which the target lateral acceleration related quantity deviates from the reference lateral acceleration related quantity in accordance with the steering-member operating amount.

3. A motion control apparatus for a vehicle according to claim 2, wherein
the prescribed rule determines the reference lateral acceleration related quantity based on an actual specification value of the vehicle which influences the turning properties of the vehicle; and
the target lateral acceleration related quantity calculating means calculates, as the target lateral acceleration related quantity, the reference lateral acceleration related quantity determined in accordance with the prescribed rule and on the basis of a control specification value instead of the actual specification value, the control specification value being deviated from the actual specification value in accordance with the vehicle-body speed or the vehicle-body speed and the steering-member operating amount.

4. A motion control apparatus for a vehicle according to claim 1, wherein
the prescribed rule determines the reference lateral acceleration related quantity based on an actual specification value of the vehicle which influences the turning properties of the vehicle; and
the target lateral acceleration related quantity calculating means calculates, as the target lateral acceleration related quantity, the reference lateral acceleration related quantity determined in accordance with the prescribed rule and on the basis of a control specification value instead of the actual specification value, the control specification value being deviated from the actual specification value in accordance with the vehicle-body speed or the vehicle-body speed and the steering-member operating amount.

5. A motion control apparatus for a vehicle according to claim 1, wherein:
the lateral acceleration related quantity is yaw rate; and
a reference yaw rate, as the reference lateral acceleration related quantity, is calculated according to the equation $Yrt=(Vso·\theta s)/(n·I)·(1/(1+Kh·Vso^2))$, wherein Vso is an estimated vehicle body speed, $\theta s$ is a steering angle, n is a gear ratio, I is a wheel base, and Kh is a stability factor.

6. A motion control apparatus for a vehicle comprising:
vehicle-body speed obtaining means for obtaining a vehicle-body speed of the vehicle;
steering-member operating amount obtaining means for obtaining an operating amount of a steering member of the vehicle which changes a steering angle of steerable wheels of the vehicle;
actual lateral acceleration related quantity obtaining means for obtaining, as an actual lateral acceleration related quantity, an actual value of a lateral acceleration related quantity indicating the extent of turning of the vehicle;
target lateral acceleration related quantity calculating means for calculating a target lateral acceleration related quantity which is a target value of the lateral acceleration related quantity, in such a manner that
the absolute value of the target lateral acceleration related quantity is equal to or less than the absolute value of a reference lateral acceleration related quantity which is a reference value of the lateral acceleration related quantity determined by a prescribed rule based on at least the vehicle-body speed and the steering-member operating amount;
braking force control means for controlling a braking force applied to each of front and rear wheels of the vehicle so that the actual lateral acceleration related quantity approaches the target lateral acceleration related quantity; and
the target lateral acceleration related quantity calculating means is constructed to calculate the target lateral acceleration related quantity in such a manner that the absolute value of the target lateral acceleration related quantity does not exceed a target lateral acceleration related quantity limiting value, which is set in accordance with an actual specification value of the vehicle which influences the generated roll angle of the vehicle;
wherein the reference lateral acceleration related quantity is a theoretical value of the lateral acceleration related quantity acting on the vehicle when the vehicle is turning in a state in which the steering-member operating amount and the vehicle-body speed are both constant, which theoretical value is calculated using a model of vehicle motion based on the steering-member operating amount and the vehicle-body speed.

7. A motion control apparatus for a vehicle according to claim 6, wherein the target lateral acceleration related quantity calculating means is constructed such that the amount by which the target lateral acceleration related quantity deviates from the reference lateral acceleration related quantity changes in accordance with the absolute value of the reference lateral acceleration related quantity.

8. A motion control apparatus for a vehicle according to claim 6, further comprising:
   road-surface friction coefficient obtaining means for obtaining a road-surface friction coefficient, which is the coefficient of friction between a road surface on which the vehicle travels and tires of the wheels of the vehicle; and
   target lateral acceleration related quantity limiting means for setting a target lateral acceleration related quantity limiting value in accordance with the road-surface friction coefficient and for limiting the target lateral acceleration related quantity, when the absolute value of the target lateral acceleration related quantity is greater than the target lateral acceleration related quantity limiting value, in such a manner that the absolute value of the target lateral acceleration related quantity coincides with the target lateral acceleration related quantity limiting value.

9. A motion control apparatus for a vehicle according to claim 7, wherein the target lateral acceleration related quantity calculating means is constructed to calculate the target lateral acceleration related quantity in such a manner that the absolute value of the target lateral acceleration related quantity does not exceed a target lateral acceleration related quantity limiting value, which is set in accordance with an actual specification value of the vehicle which influences the generated roll angle of the vehicle.

10. A motion control apparatus for a vehicle according to claim 7, further comprising:
    road-surface friction coefficient obtaining means for obtaining a road-surface friction coefficient, which is the coefficient of friction between a road surface on which the vehicle travels and tires of the wheels of the vehicle; and
    target lateral acceleration related quantity limiting means for setting a target lateral acceleration related quantity limiting value in accordance with the road-surface friction coefficient and for limiting the target lateral acceleration related quantity, when the absolute value of the target lateral acceleration related quantity is greater than the target lateral acceleration related quantity limiting value, in such a manner that the absolute value of the target lateral acceleration related quantity coincides with the target lateral acceleration related quantity limiting value.

11. A motion control apparatus for a vehicle according to claim 6, wherein:
    the lateral acceleration related quantity is lateral acceleration; and
    a reference lateral acceleration, as the reference lateral acceleration related quantity, is calculated according to the equation $Gybase = (Vso^2 \cdot \theta s)/(n \cdot I) \cdot (1/(1+Kh \cdot Vso^2))$, wherein Vso is an estimated vehicle body speed, $\theta s$ is a steering angle, n is a gear ratio, I is a wheel base, and Kh is a stability factor.

* * * * *